(12) United States Patent
Scott et al.

(10) Patent No.: US 7,443,137 B2
(45) Date of Patent: *Oct. 28, 2008

(54) ADAPTER FOR A POWER TOOL BATTERY

(75) Inventors: John S. Scott, Brookfield, WI (US); Mark Kubale, West Bend, WI (US); David Rozwadowski, Milwaukee, WI (US); Pamela Stegehuis, Helenville, WI (US); Robert Crisp, Mukwonago, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/609,675

(22) Filed: Dec. 12, 2006

(65) Prior Publication Data
US 2007/0224492 A1  Sep. 27, 2007

Related U.S. Application Data

(63) Continuation-in-part of application No. 11/252,272, filed on Oct. 17, 2005, now Pat. No. 7,339,350, which is a continuation of application No. 10/635,058, filed on Aug. 6, 2003, now Pat. No. 6,965,214, which is a continuation of application No. 10/299,200, filed on Nov. 19, 2002, now Pat. No. 6,621,246, which is a continuation of application No. 09/755,537, filed on Jan. 5, 2001, now Pat. No. 6,525,511, application No. 11/609,675, which is a continuation-in-part of application No. 11/095,780, filed on Mar. 31, 2005, now Pat. No. 7,183,745.

(60) Provisional application No. 60/750,087, filed on Dec. 13, 2005, provisional application No. 60/224,662, filed on Aug. 11, 2000.

(51) Int. Cl.
*H01M 10/46* (2006.01)
(52) U.S. Cl. ...................................... 320/114
(58) Field of Classification Search ................ 320/107, 320/110, 112, 114, 115
See application file for complete search history.

(56) References Cited

U.S. PATENT DOCUMENTS 3,999,110 A  12/1976  Ramstrom et al.

(Continued)

FOREIGN PATENT DOCUMENTS

AU  762976 B2  8/2000

(Continued)

OTHER PUBLICATIONS

IBM, Automatic Charge Rate Adjustment for Multiple Batteries, Technical Disclosure Bulletin, Mar. 1994, vol. 37 No. 3, IBM.

(Continued)

*Primary Examiner*—Edward Tso
(74) *Attorney, Agent, or Firm*—Michael Best & Friedrich LLP

(57) ABSTRACT

The invention provides an electrical combination including a power tool having a housing supporting a motor, which is operable to drive a tool element. The electrical combination also includes a battery and an adapter supportable on the housing of the power tool and electrically connectable to the power tool and the battery such that the adapter transfers electrical power between the battery and the motor. The adapter has a locking arrangement engageable with the battery for preventing the adapter from being removed from the power tool housing while the battery is connected to the adapter.

22 Claims, 35 Drawing Sheets

U.S. PATENT DOCUMENTS

| | | | |
|---|---|---|---|
| 4,006,396 A | 2/1977 | Bogut |
| 4,123,598 A | 10/1978 | Hammel |
| 4,186,983 A | 2/1980 | Kaye |
| 4,309,067 A | 1/1982 | Riley, Jr. |
| 4,315,364 A | 2/1982 | Leffingwell |
| D265,985 S | 8/1982 | House, II |
| 4,447,749 A | 5/1984 | Reeb, Jr. et al. |
| D278,704 S | 5/1985 | Claxton et al. |
| 4,530,034 A | 7/1985 | Kawarada |
| 4,576,880 A | 3/1986 | Verdier et al. |
| 4,716,352 A | 12/1987 | Hurn et al. |
| 4,737,420 A | 4/1988 | Ikeda et al. |
| 4,746,298 A | 5/1988 | Hollander |
| 4,835,410 A | 5/1989 | Bhagwat et al. |
| 4,871,629 A | 10/1989 | Bunyea |
| 4,943,498 A | 7/1990 | Cooper et al. |
| 4,957,831 A | 9/1990 | Meredith et al. |
| 4,969,206 A | 11/1990 | Desrochers |
| 5,030,902 A | 7/1991 | Mattinger et al. |
| 5,057,383 A | 10/1991 | Sokira |
| 5,076,805 A | 12/1991 | Welch |
| 5,095,259 A | 3/1992 | Bailey et al. |
| 5,132,800 A | 7/1992 | Wada et al. |
| 5,136,229 A | 8/1992 | Galvin |
| 5,138,245 A | 8/1992 | Mattinger et al. |
| 5,144,217 A | 9/1992 | Gardner et al. |
| 5,148,094 A | 9/1992 | Parks et al. |
| 5,151,727 A | 9/1992 | Sasaki |
| 5,159,256 A | 10/1992 | Mattinger et al. |
| 5,169,225 A | 12/1992 | Palm |
| 5,187,422 A | 2/1993 | Izenbaard et al. |
| 5,192,904 A | 3/1993 | Leiserson |
| 5,200,686 A | 4/1993 | Lee |
| 5,200,690 A | 4/1993 | Uchida |
| 5,213,913 A | 5/1993 | Anthony, III et al. |
| 5,217,395 A | 6/1993 | Bailey et al. |
| 5,227,262 A | 7/1993 | Ozer |
| 5,229,701 A | 7/1993 | Léman et al. |
| 5,231,913 A | 8/1993 | Reinartz et al. |
| 5,240,787 A | 8/1993 | Goldschmidt et al. |
| 5,248,927 A | 9/1993 | Takei et al. |
| 5,341,171 A | 8/1994 | Mori et al. |
| 5,354,215 A | 10/1994 | Viracola |
| 5,368,954 A | 11/1994 | Bruns |
| 5,391,972 A | 2/1995 | Gardner et al. |
| 5,470,255 A | 11/1995 | McCleerey et al. |
| 5,476,729 A | 12/1995 | Miller, Jr. et al. |
| 5,518,424 A | 5/1996 | Douty et al. |
| 5,552,240 A | 9/1996 | Derstine |
| 5,553,675 A | 9/1996 | Pitzen et al. |
| 5,602,454 A | 2/1997 | Arakawa et al. |
| 5,620,808 A | 4/1997 | Wheeler et al. |
| 5,634,815 A | 6/1997 | Inazuka et al. |
| 5,659,236 A | 8/1997 | Hahn |
| 5,686,808 A | 11/1997 | Lutz |
| 5,718,985 A | 2/1998 | Bunyea et al. |
| 5,734,253 A | 3/1998 | Brake et al. |
| 5,757,163 A | 5/1998 | Brotto et al. |
| 5,769,657 A | 6/1998 | Kondo et al. |
| 5,782,654 A | 7/1998 | Inazuka et al. |
| D396,687 S | 8/1998 | Somers |
| D397,084 S | 8/1998 | Siddoway |
| 5,792,573 A | 8/1998 | Pitzen et al. |
| 5,818,197 A | 10/1998 | Miller et al. |
| 5,856,038 A | 1/1999 | Mason |
| 5,926,005 A | 7/1999 | Holcomb et al. |
| 5,929,597 A | 7/1999 | Pfeifer et al. |
| 5,933,496 A | 8/1999 | McKinnon |
| D415,100 S | 10/1999 | Buck |
| 5,963,011 A | 10/1999 | Haller et al. |
| 6,007,373 A | 12/1999 | Chew |
| 6,057,608 A | 5/2000 | Bailey, Jr. et al. |
| 6,075,341 A | 6/2000 | White et al. |
| 6,104,162 A | 8/2000 | Sainsbury et al. |
| D432,077 S | 10/2000 | Zurwelle et al. |
| 6,151,451 A | 11/2000 | Yukitake et al. |
| 6,168,881 B1 | 1/2001 | Fischer et al. |
| 6,181,032 B1 | 1/2001 | Marshall et al. |
| 6,237,698 B1 | 5/2001 | Carrier et al. |
| 6,285,159 B1 | 9/2001 | Ki et al. |
| 6,296,065 B1 | 10/2001 | Carrier |
| 6,304,058 B2 | 10/2001 | Watson et al. |
| 6,308,059 B1 | 10/2001 | Domes |
| 6,326,101 B1 | 12/2001 | White et al. |
| 6,329,788 B1 | 12/2001 | Bailey, Jr. et al. |
| 6,350,149 B1 | 2/2002 | Nakane |
| 6,371,535 B2 | 4/2002 | Wei et al. |
| D460,413 S | 7/2002 | Zurwelle et al. |
| D466,863 S | 12/2002 | Zurwelle et al. |
| 6,495,932 B1 | 12/2002 | Yoshimizu et al. |
| 6,500,581 B2 | 12/2002 | White et al. |
| 6,501,197 B1 | 12/2002 | Cornog et al. |
| 6,502,949 B1 | 1/2003 | Horiyama et al. |
| 6,515,451 B2 | 2/2003 | Watson et al. |
| 6,525,511 B2 | 2/2003 | Kubale et al. |
| 6,534,885 B2 | 3/2003 | Nakagawa et al. |
| 6,562,509 B1 | 5/2003 | Eggert |
| 6,566,843 B2 | 5/2003 | Takano et al. |
| D475,679 S | 6/2003 | Cooper et al. |
| D477,811 S | 7/2003 | Niwa et al. |
| 6,597,572 B2 | 7/2003 | Nishikawa et al. |
| 6,617,824 B1 | 9/2003 | Zedell et al. |
| 6,621,246 B2 | 9/2003 | Kubale et al. |
| D481,672 S | 11/2003 | Niwa et al. |
| 6,641,950 B2 | 11/2003 | White et al. |
| 6,653,815 B2 | 11/2003 | Watson et al. |
| D484,384 S | 12/2003 | Ghode et al. |
| D484,850 S | 1/2004 | Johnson |
| D487,426 S | 3/2004 | Johnson |
| D488,774 S | 4/2004 | Zufall et al. |
| D490,052 S | 5/2004 | Zufall et al. |
| 6,729,413 B2 | 5/2004 | Turner et al. |
| 6,781,249 B2 | 8/2004 | Holder et al. |
| 6,840,335 B1 | 1/2005 | Wu |
| D504,111 S | 4/2005 | Ozawa et al. |
| D504,394 S | 4/2005 | Cheung et al. |
| 6,876,173 B2 | 4/2005 | Mastaler et al. |
| 6,891,457 B2 | 5/2005 | Sako |
| 6,933,689 B2 | 8/2005 | Yamamoto |
| D509,189 S | 9/2005 | Buck |
| 6,943,527 B2 | 9/2005 | Liu et al. |
| 6,965,213 B2 | 11/2005 | Schadoffsky et al. |
| 6,965,214 B2 | 11/2005 | Kubale et al. |
| 7,005,831 B2 | 2/2006 | Watson et al. |
| 7,064,520 B2 | 6/2006 | Heigl et al. |
| 2001/0017531 A1 | 8/2001 | Sakakibara et al. |
| 2003/0011245 A1 | 1/2003 | Fiebig |
| 2003/0090162 A1 | 5/2003 | Cornog et al. |
| 2004/0051502 A1 | 3/2004 | White et al. |
| 2004/0072064 A1 | 4/2004 | Turner et al. |
| 2004/0095094 A1 | 5/2004 | Kubale et al. |
| 2004/0106036 A1 | 6/2004 | Geis et al. |
| 2004/0192106 A1 | 9/2004 | Britz |
| 2004/0197175 A1 | 10/2004 | Turner et al. |
| 2005/0264260 A1* | 12/2005 | Zick et al. .................. 320/114 |
| 2006/0151189 A1 | 7/2006 | Wu |

FOREIGN PATENT DOCUMENTS

| | | |
|---|---|---|
| CA | 2 169 261 C | 2/1995 |
| DE | 26 18 748 A1 | 11/1977 |
| DE | 3742268 A1 | 6/1989 |
| DE | 3825120 A1 | 11/1989 |
| DE | 4031090 A1 | 4/1992 |

| | | | |
|---|---|---|---|
| DE | 42 16 045 A1 | 11/1993 |
| DE | 94 04 008 U1 | 7/1994 |
| DE | 44 02 355 A1 | 8/1995 |
| DE | 29509191 U1 | 8/1995 |
| DE | 19933015 A1 | 5/2000 |
| DE | 10055158 A1 | 7/2001 |
| DE | 10056370 A1 | 7/2001 |
| DE | 10040893 A1 | 8/2001 |
| DE | 10125157 A1 | 11/2001 |
| DE | 10124537 A1 | 2/2002 |
| DE | 20305628 U1 | 6/2003 |
| DE | 10233162 A1 | 2/2004 |
| DE | 10313187 A1 | 10/2004 |
| DE | 20023629 U1 | 5/2005 |
| EP | 0 255 568 A2 | 2/1988 |
| EP | 0 341 395 B1 | 11/1989 |
| EP | 0 545 132 A1 | 6/1993 |
| EP | 0 548 651 B1 | 6/1993 |
| EP | 0 561 423 A2 | 9/1993 |
| EP | 0 572 327 A1 | 12/1993 |
| EP | 0 707 350 A1 | 4/1996 |
| EP | 0 786 821 A1 | 7/1997 |
| EP | 0 734 083 B1 | 12/1999 |
| EP | 0 720 780 B1 | 12/2001 |
| EP | 0 714 235 B1 | 1/2002 |
| EP | 1289032 A1 | 3/2003 |
| EP | 1025962 B1 | 9/2003 |
| EP | 1382421 A2 | 1/2004 |
| EP | 1025961 B1 | 6/2004 |
| EP | 1035599 B1 | 10/2004 |
| EP | 1076370 B1 | 12/2004 |
| EP | 1481769 A1 | 12/2004 |
| EP | 1516702 A2 | 3/2005 |
| EP | 1555703 A2 | 7/2005 |
| EP | 1069630 B1 | 9/2005 |
| EP | 1363339 B1 | 10/2005 |
| EP | 1584435 A2 | 10/2005 |
| EP | 0979711 B1 | 1/2006 |
| EP | 1363340 B1 | 6/2006 |
| EP | 1683608 A1 | 7/2006 |
| EP | 1696498 A1 | 8/2006 |
| EP | 1698437 A1 | 9/2006 |
| EP | 1699097 A1 | 9/2006 |
| FI | 901889 | 10/1991 |
| GB | 2215386 A | 9/1989 |
| GB | 2302050 A | 1/1997 |
| GB | 2302051 A | 1/1997 |
| GB | 2386746 B | 2/2004 |
| GB | 2392002 B | 2/2004 |
| GB | 2399701 A | 9/2004 |
| GB | 2380761 B | 2/2005 |
| GB | 2408396 A | 5/2005 |
| GB | 2417978 A | 3/2006 |
| GB | 2418057 A | 3/2006 |
| GB | 2419242 A | 4/2006 |
| GB | 2419243 A | 4/2006 |
| GB | 2419244 A | 4/2006 |
| GB | 2419245 A | 4/2006 |
| GB | 2420027 A | 5/2006 |
| GB | 2420028 A | 5/2006 |
| GB | 2420029 A | 5/2006 |
| GB | 2420030 A | 5/2006 |
| GB | 2420031 A | 5/2006 |
| GB | 2420032 A | 5/2006 |
| GB | 2396755 B | 7/2006 |
| GB | 2422047 A | 7/2006 |
| GB | 2418060 B | 9/2006 |
| JP | 1-227349 A | 9/1989 |
| JP | 2-19187 A | 1/1990 |
| JP | 3052555 | 3/1991 |
| JP | 3503986 T | 9/1991 |
| JP | 4-253171 A | 9/1992 |
| WO | WO 89/07997 A1 | 9/1989 |
| WO | WO 92/05919 A1 | 4/1992 |
| WO | WO 95/00992 A1 | 1/1995 |
| WO | WO 95/05071 A2 | 2/1995 |
| WO | WO 95/05683 A1 | 2/1995 |
| WO | WO 95/24061 A1 | 9/1995 |
| WO | WO 98/48470 A1 | 10/1998 |
| WO | WO 00/77865 A1 | 12/2000 |
| WO | WO 01/05559 A2 | 1/2001 |
| WO | WO 2005/038954 | 4/2005 |
| WO | WO 2005/099043 A2 | 10/2005 |
| WO | WO 2006/027284 A1 | 3/2006 |
| WO | WO 2006/040204 A1 | 4/2006 |
| WO | WO 2006/089810 A1 | 8/2006 |

OTHER PUBLICATIONS

Makita, Makita's 24V Maximum Cordless with MakStar System, Press Release, Jul. 28, 2000, La Mirada, CA-Makita USA, Inc.
Snap-on, Catalog 800, Power Tools, Cordless Batteries and Chargers, p. 256.
Snap-on, http://buy1.snapon.com/catalog/tools.asp?tool=power&Group_ID=19406&store=snapon-store, webpage accessed Jan. 26, 2007.
Snap-on, http://buy1.snapon.com/catalog/printPage.asp?tool=power&Item_iD=76925&PartNo=CTB, webpage accessed Jan. 26, 2007.

* cited by examiner

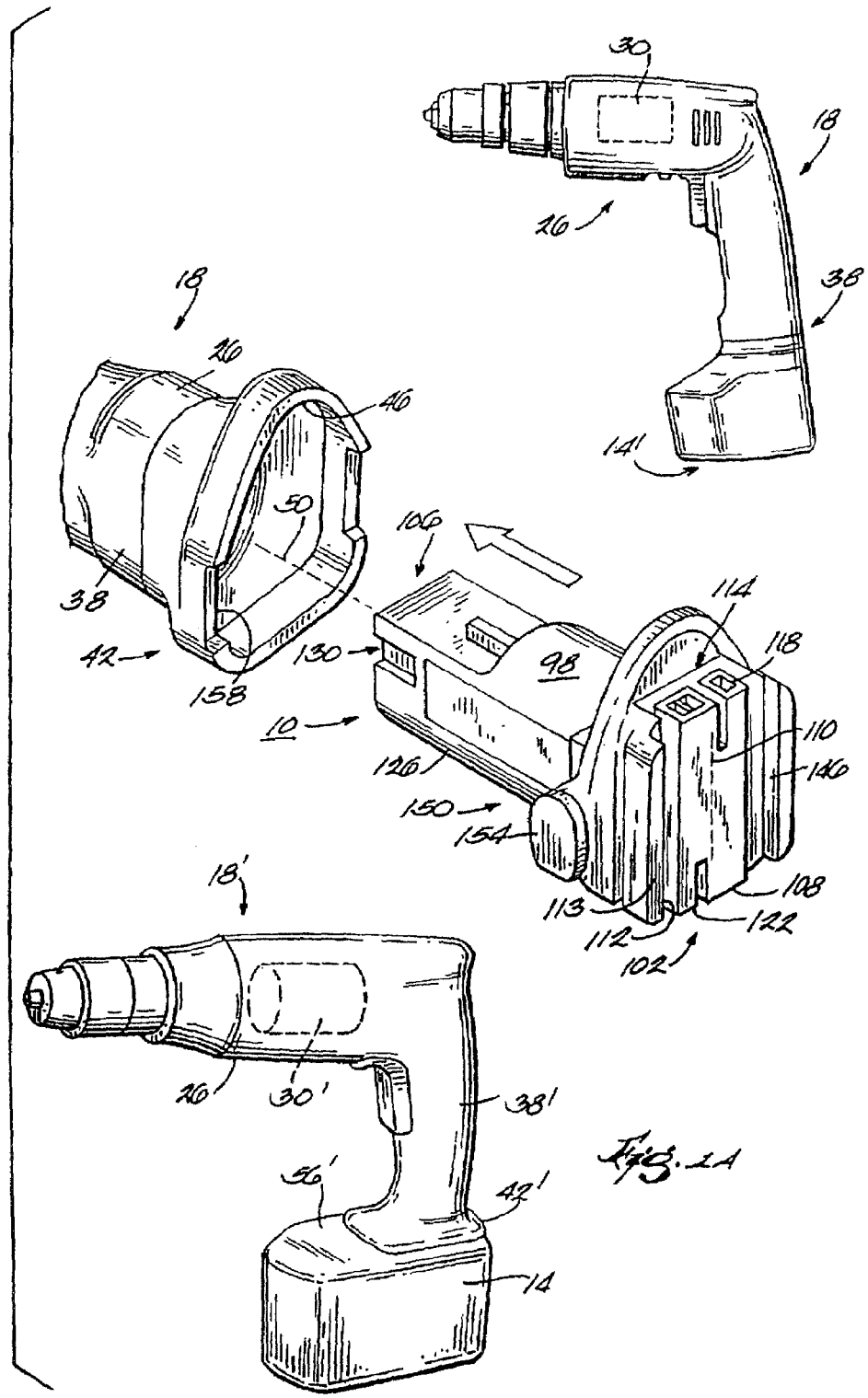

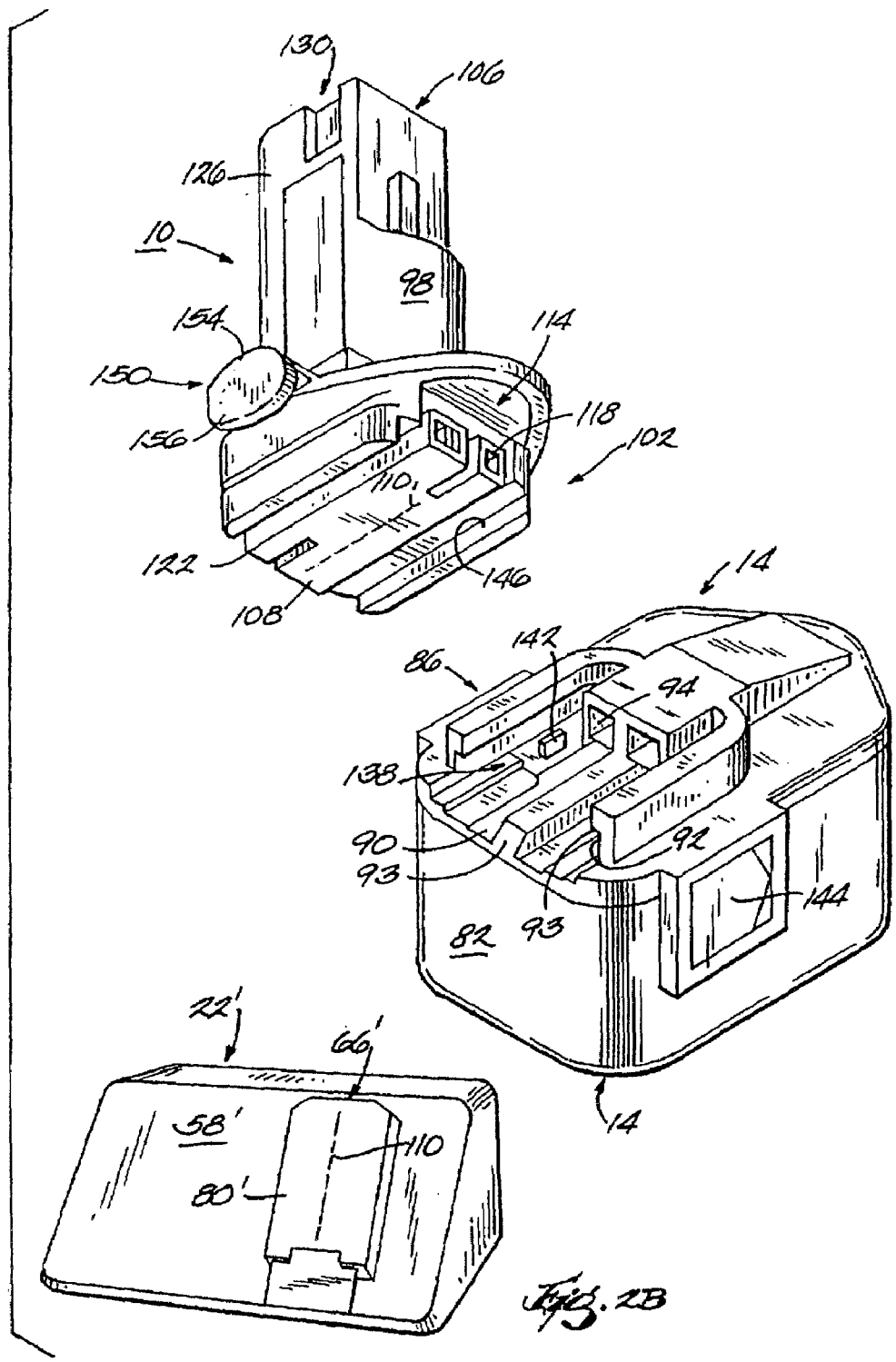

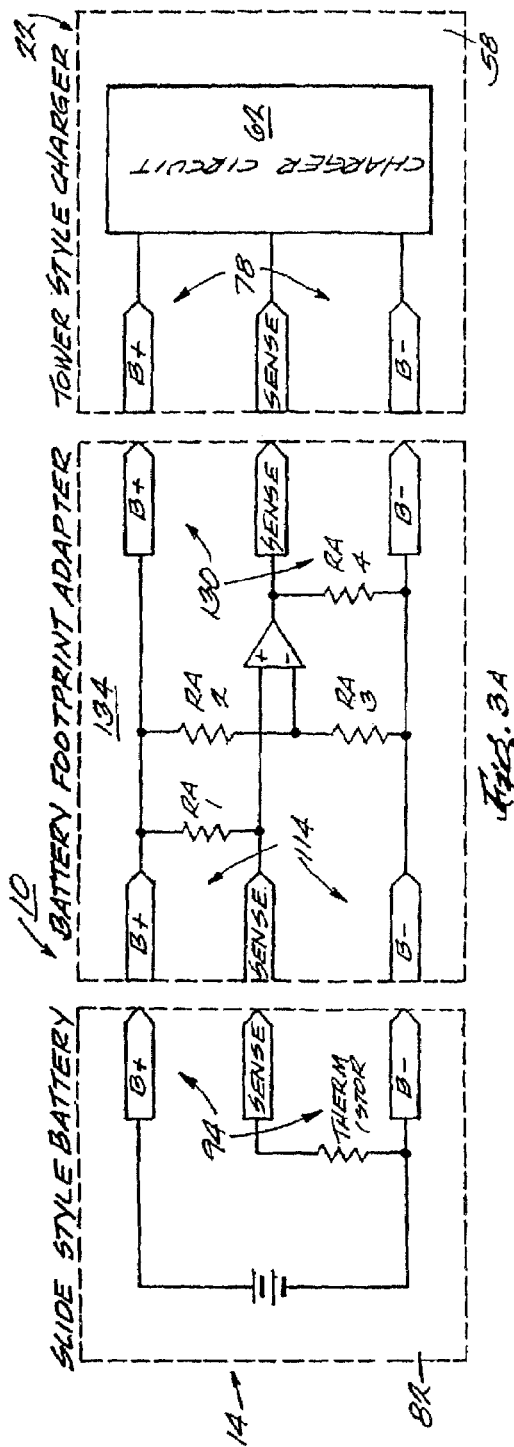
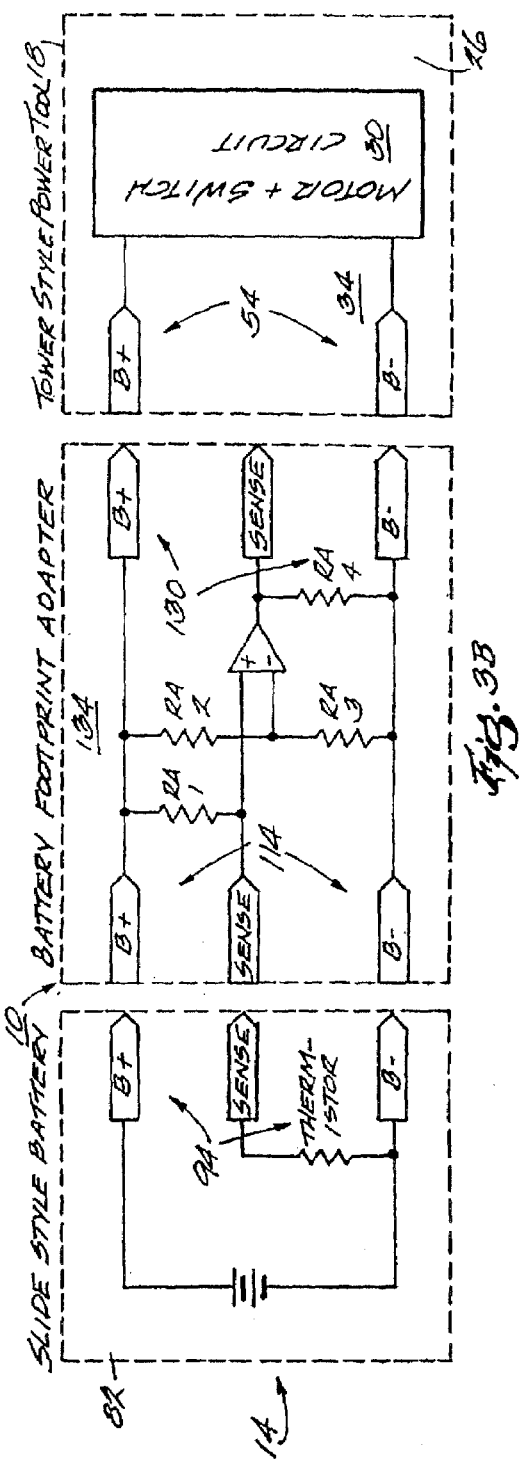
Fig. 3A
Fig. 3B

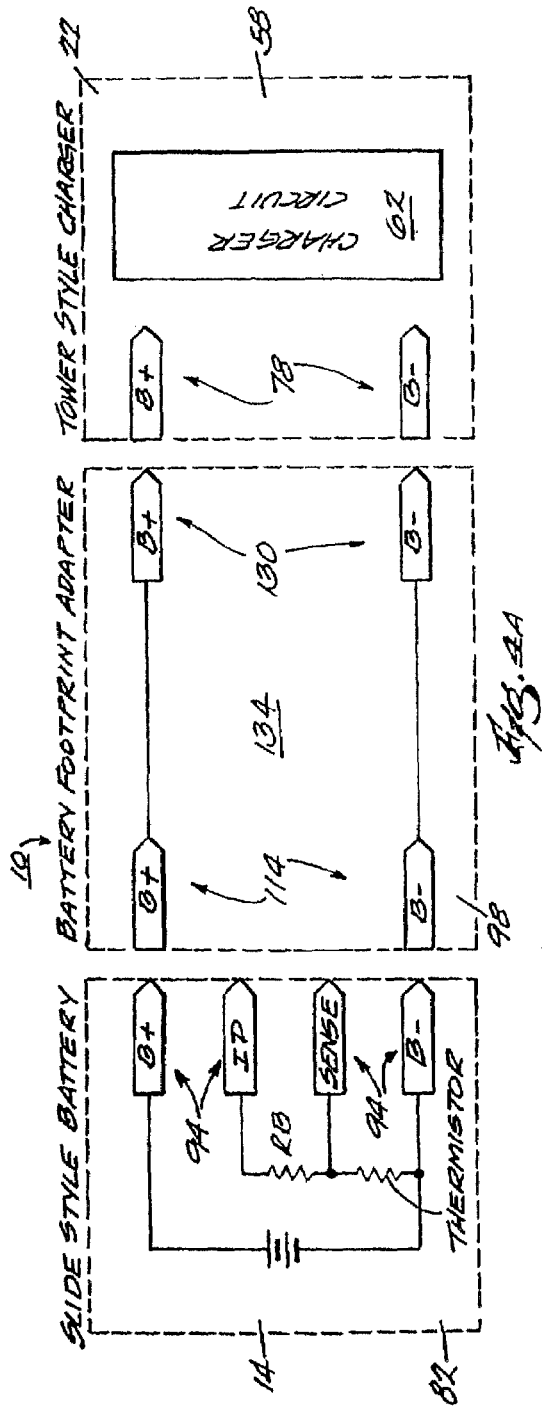
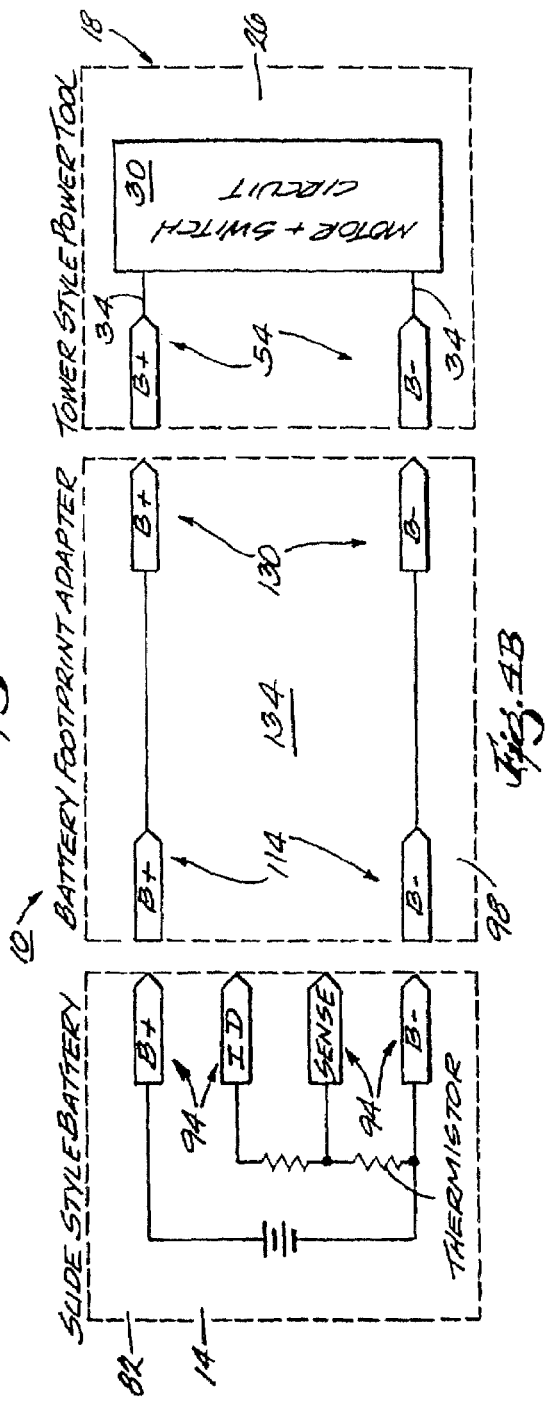

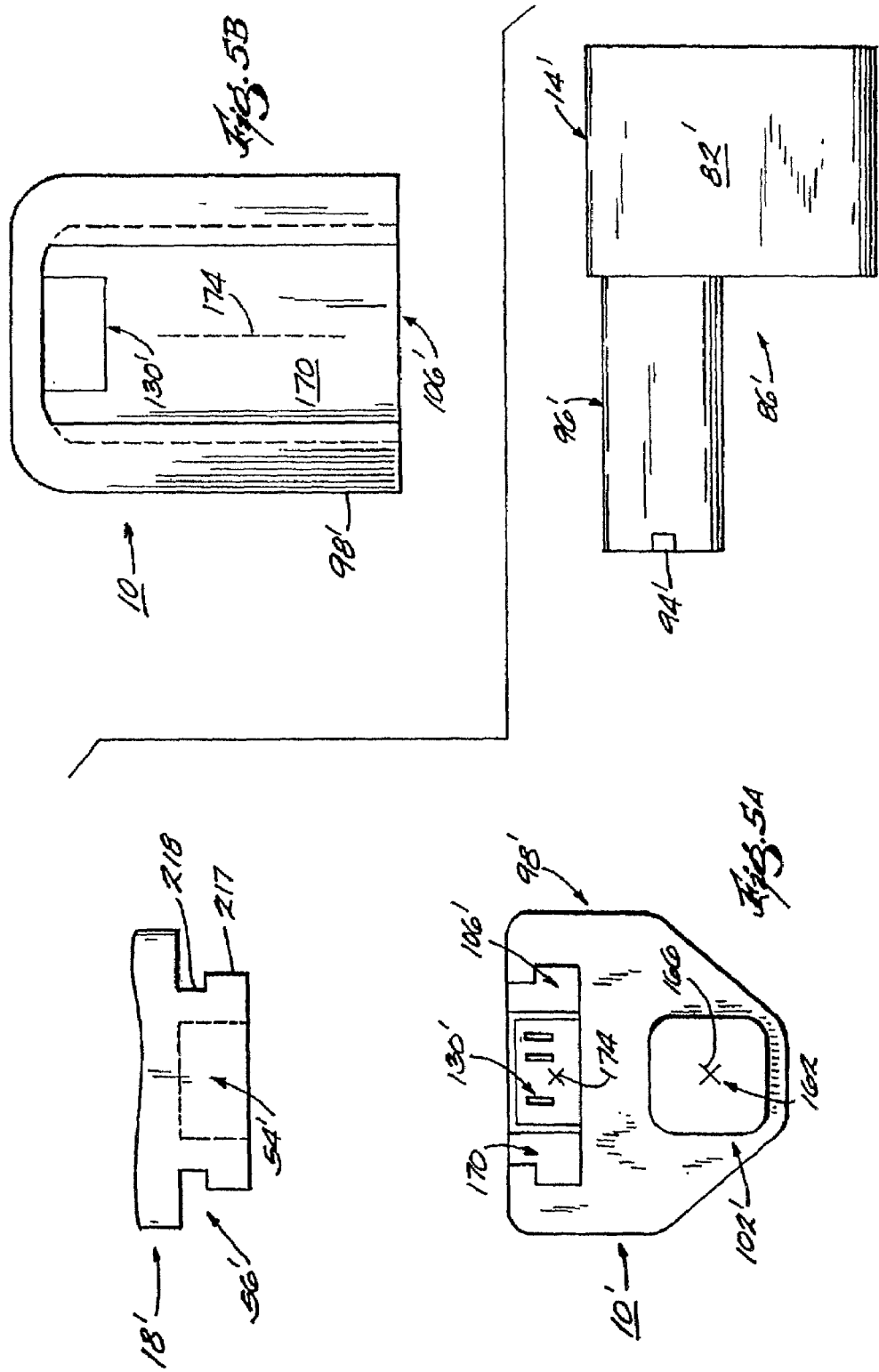

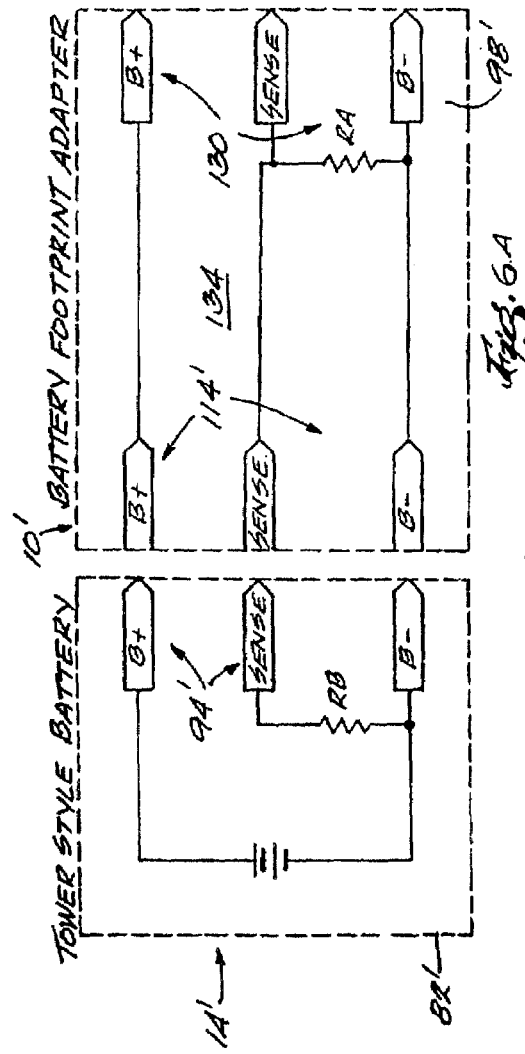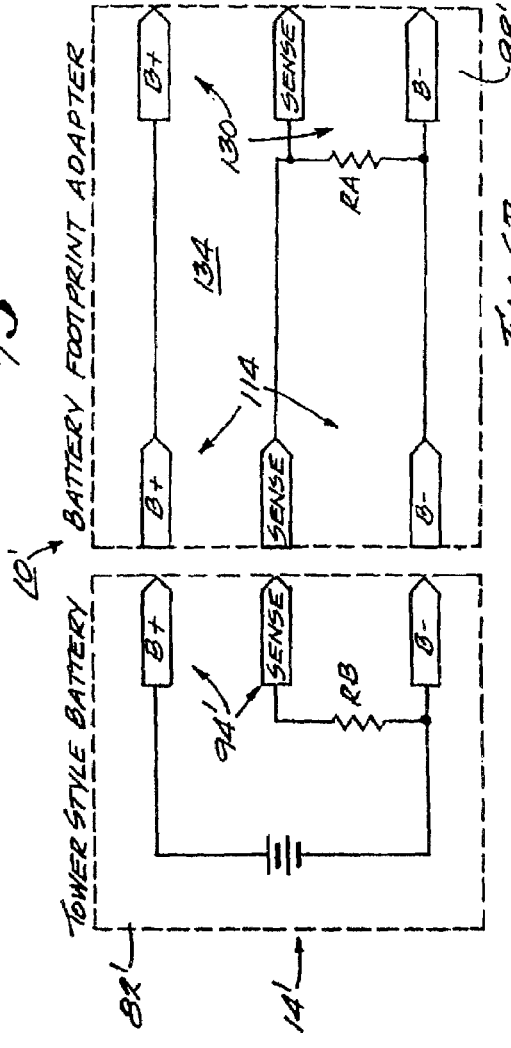
Fig. 6A
Fig. 6B

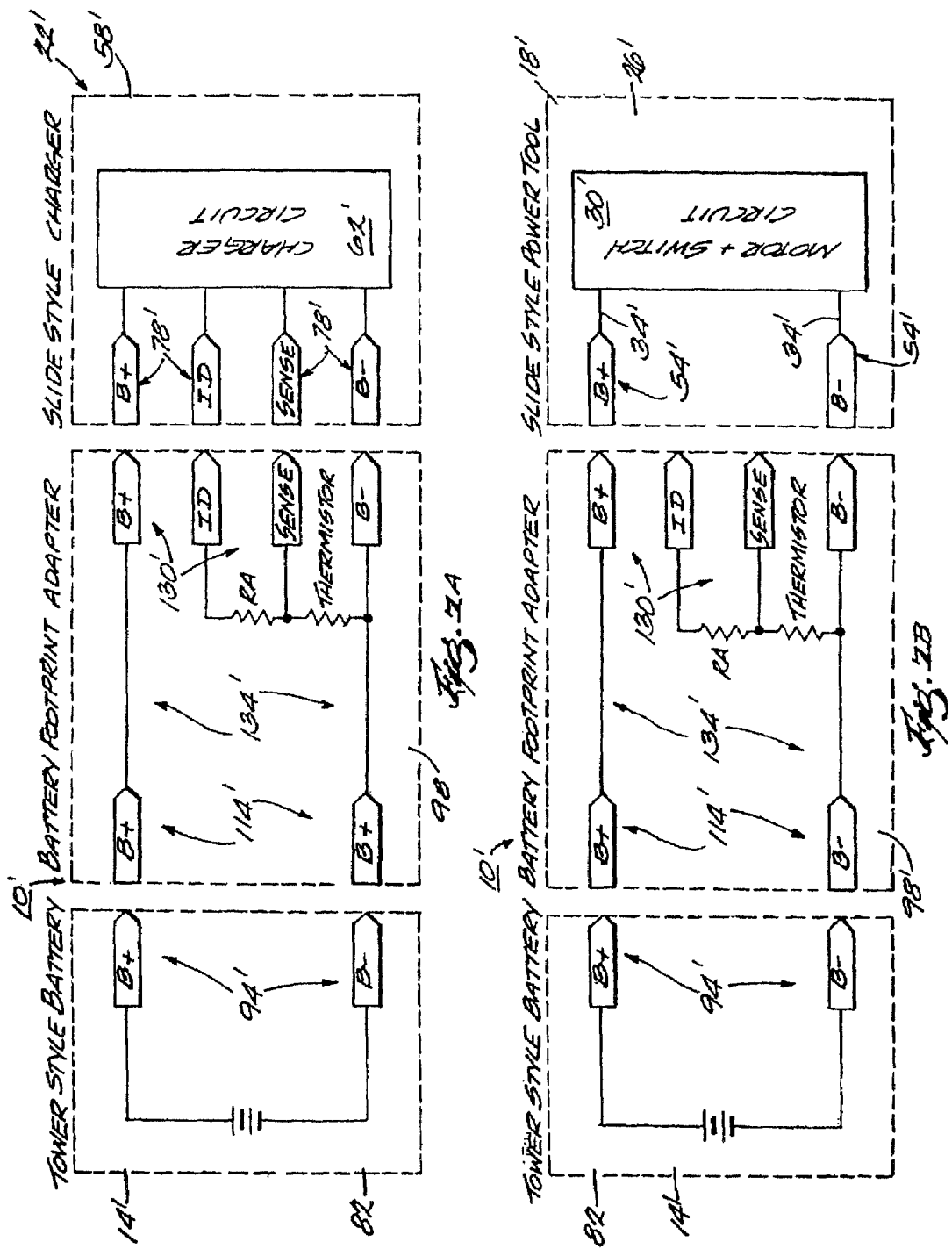

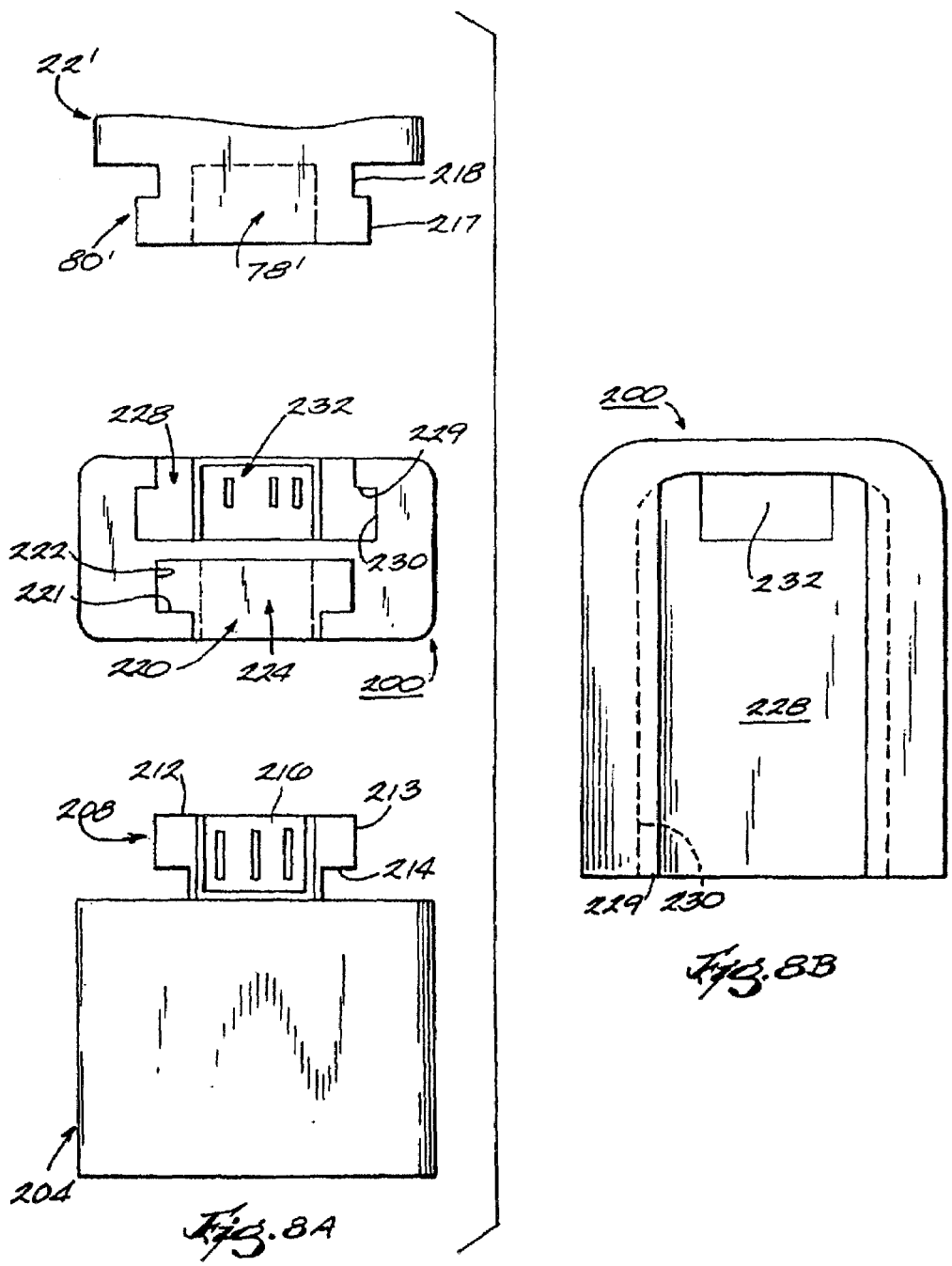

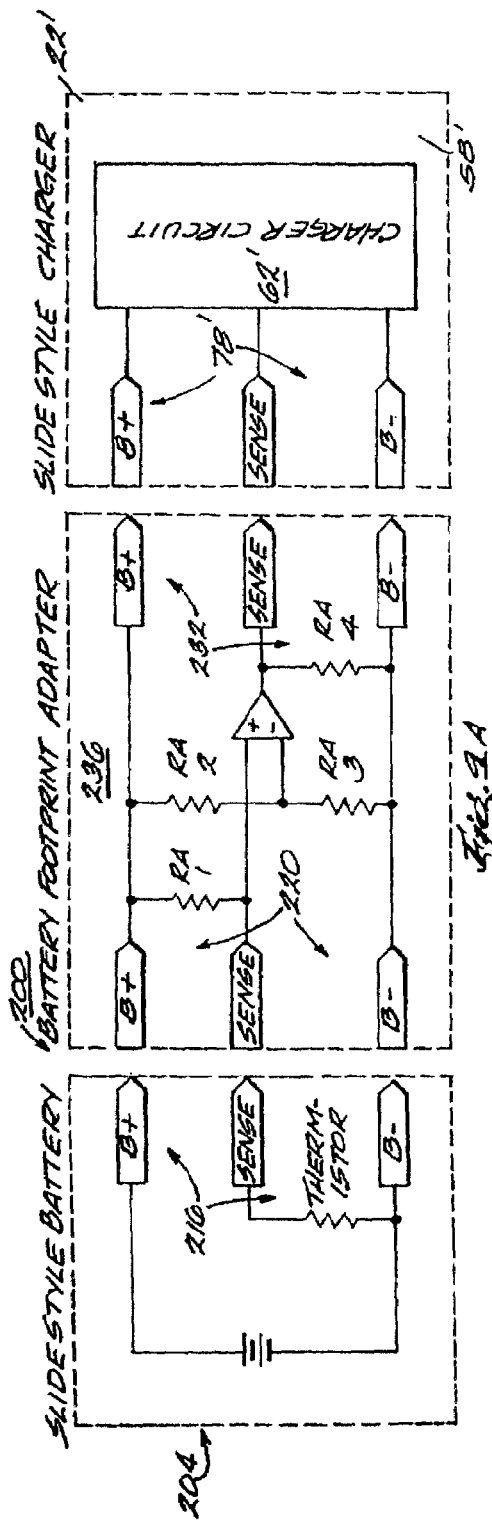
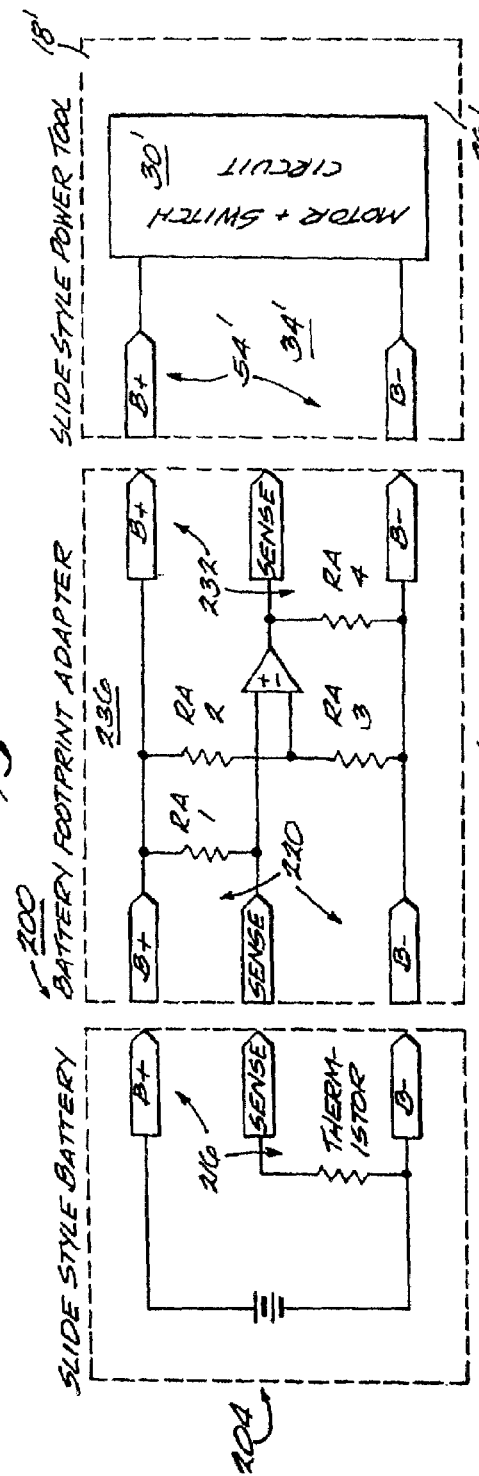
Fig. 9A
Fig. 9B

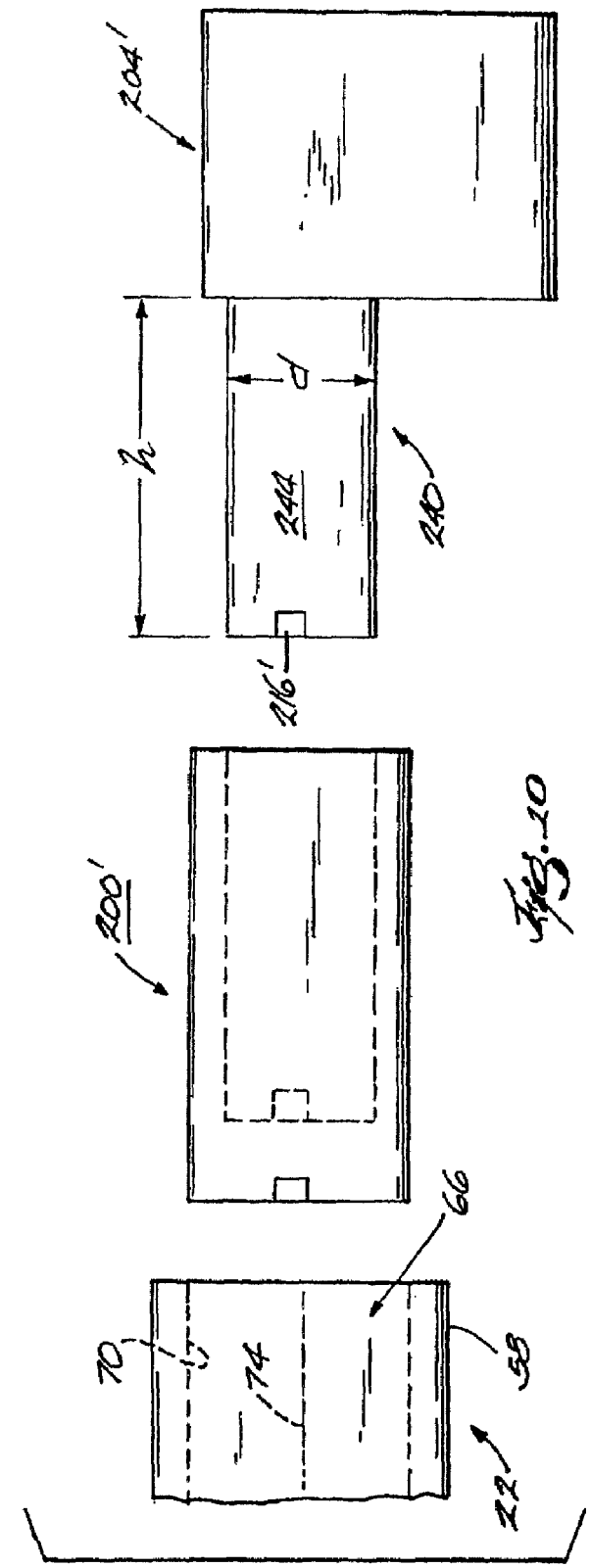

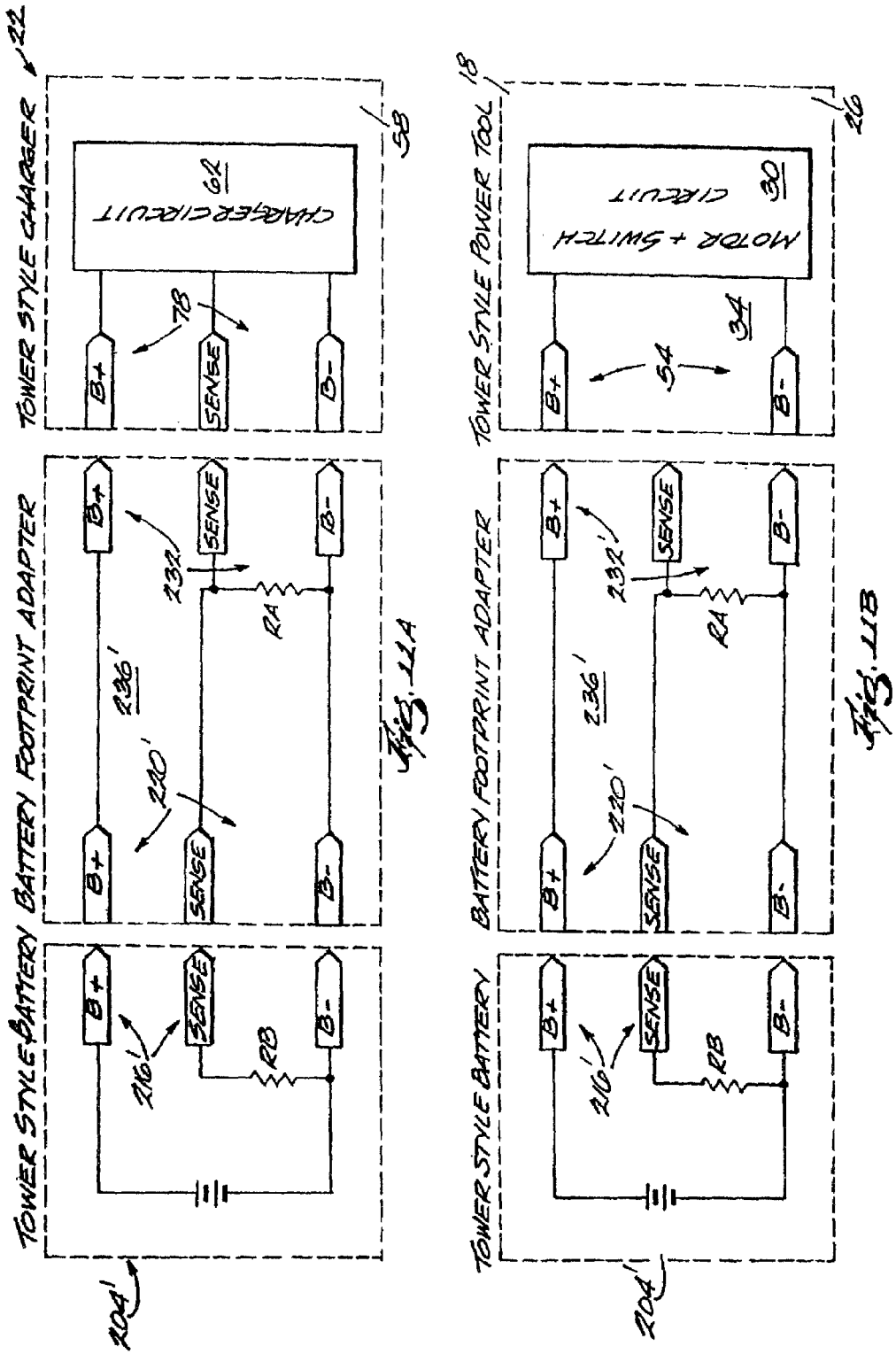

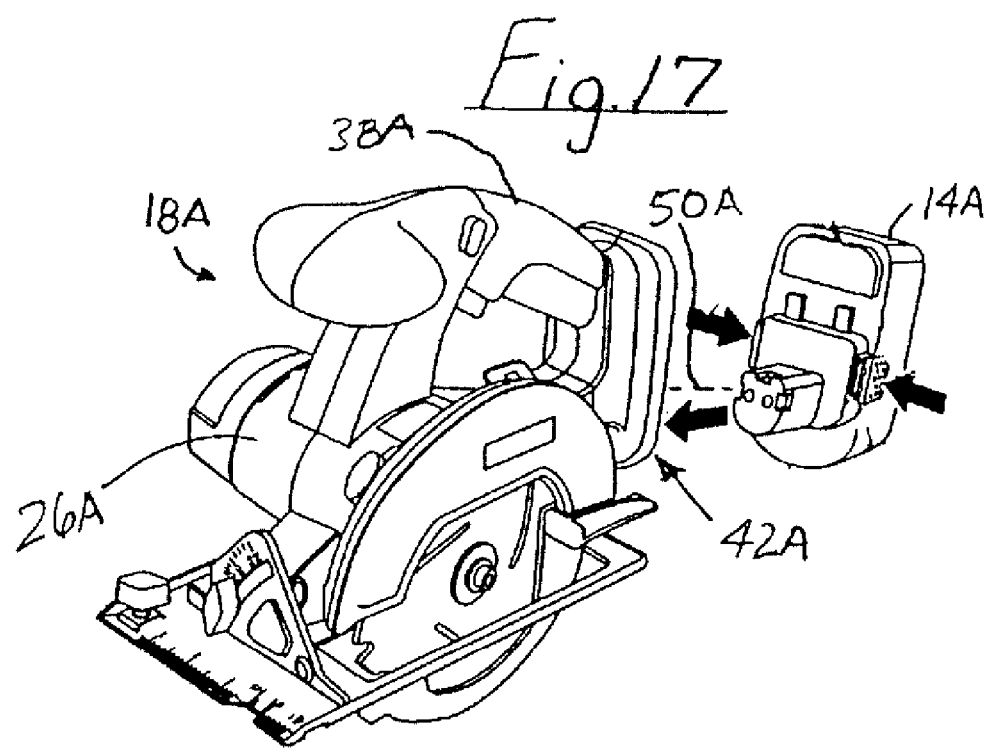

ADAPTER FOR A POWER TOOL BATTERY

RELATED APPLICATIONS

The present application claims priority under 35 U.S.C. §119 to Provisional Patent Application No. 60/750,087 filed on Dec. 13, 2005, the entire contents of which is hereby incorporated by reference.

In addition, the present application is a continuation-in-part of co-pending application Ser. No. 11/252,272, filed Oct. 17, 2005, which is a continuation of co-pending continuation patent application Ser. No. 10/635,058, filed on Aug. 6, 2003, now U.S. Pat. No. 6,965,214, issued Nov. 15, 2005, which is a continuation of patent application Ser. No. 10/299,200, filed on Nov. 19, 2002, now U.S. Pat. No. 6,621,246, issued Sep. 16, 2003, which is a continuation of patent application Ser. No. 09/755,537, filed on Jan. 5, 2001, now U.S. Pat. No. 6,525,511, issued Feb. 25, 2003, which claims the benefit of prior filed provisional patent application Ser. No. 60/224,662, filed on Aug. 11, 2000, the entire contents of all of which are hereby incorporated by reference.

The present application is also a continuation-in-part of co-pending application Ser. No. 11/095,780, filed Mar. 31, 2005, which is a continuation of co-pending continuation patent application Ser. No. 10/635,058, filed on Aug. 6, 2003, now U.S. Pat. No. 6,965,214, issued Nov. 15, 2005, which is a continuation of patent application Ser. No. 10/299,200, filed on Nov. 19, 2002, now U.S. Pat. No. 6,621,246, issued Sep. 16, 2003, which is a continuation of patent application Ser. No. 09/755,537, filed on Jan. 5, 2001, now U.S. Pat. No. 6,525,511, issued Feb. 25, 3003, which claims the benefit of prior filed provisional patent application Ser. No. 60/224,662, filed on Aug. 11, 2000, the entire contents of all of which are hereby incorporated by reference.

FIELD OF THE INVENTION

The present invention relates to cordless power tools and, more particularly, to battery packs, power tools, and/or battery chargers.

BACKGROUND OF THE INVENTION

Generally, a cordless power tool includes a tool housing and an electric motor supported by the housing and operable to drive a tool element. A power tool battery is supported by the housing and is electrically connectable to the motor to selectively supply power to the motor.

To charge the battery, a battery charger is provided. Typically, a battery charger includes a charger housing and a charging circuit supported by the charger housing and electrically connectable to a power source. The battery is supported by the charger housing and electrically connected to the charging circuit so that power is selectively supplied to the battery to charge the battery.

SUMMARY

There are two types of general configurations for a power tool battery (and for the power tool and the battery charger). The first type is a "tower" battery configuration. In the "tower" configuration, a portion of the tool housing, such as the handle, defines an opening, and the battery includes a "tower" or insertion portion which is inserted into the opening to support the battery on the tool housing and to electrically connect the battery to the motor. To charge the "tower" battery, the charger housing defines a similar opening, and the "tower" portion of the battery is inserted into the opening in the charger housing to support the battery on the charger housing and to electrically connect the battery to the charging circuit.

A second type of battery configuration is the "slide-on" configuration. In the "slide-on" configuration, the tool housing includes a support portion, and the battery slides onto the support portion. The support portion and the battery include inter-engaging connecting structure to physically connect the battery to the tool housing and to electrically connect the battery to the motor. To charge the "slide-on" battery, the charger housing includes a similar support portion, and the battery and the charger housing include similar inter-engaging connecting structure to physically connect the battery to the charger housing and to electrically connect the battery to the charging circuit.

In each general configuration, many different battery constructions (and power tool/battery charger constructions) exist. In each construction, the battery (and the power tool/battery charger) includes a specific connecting structure (size, shape, connectors, position of connectors, etc.) for physically connecting the battery to the power tool and/or to the charger for electrically connecting the battery to the motor and/or to the charging circuit.

One independent problem with the above-described battery arrangements is that a battery having one configuration, such as the "slide-on" configuration, is not useable with a power tool having another configuration, such as the "tower" configuration, or vice versa.

Another independent problem with the above-described battery arrangements is that a battery having one configuration, such as the "slide-on" configuration, cannot be charged by a charger having the other configuration, such as the "tower" configuration, or vice versa.

Yet another independent problem with the above-described battery arrangements is that a battery having one general configuration, such as a "slide-on" configuration with a first connecting structure, may not be useable with a power tool of the same general configuration but having a different connecting structure, such as a power tool including a "slide-on" configuration but with a different second connecting structure. The differences in the connecting structures, to physically and/or electrically connect the battery to the power tool, prevent the battery from being used with the power tool. The same applies for "tower" batteries and "tower" power tools having different connecting structures.

A further independent problem with the above-described battery arrangements is that the battery having one general configuration, such as a "slide-on" battery with a first connecting structure, may not be chargeable by a battery charger having the same general configuration but having a different connecting structure, such as a "slide-on" battery charger having a second connecting structure configuration. The differences in the connecting structure, to physically and/or electrically connect the battery to the battery charger, prevent the battery from being charged by the battery charger. The same applies for "tower" batteries and "tower" battery chargers having different connecting structures.

The present invention provides an adapter for a power tool battery which substantially alleviates one or more of the above-described and other problems with the above-described battery arrangements. More particularly, in some embodiments, the invention provides an adapter which is used to connect a battery having a first general configuration, such as a "slide-on" configuration or a "tower" configuration, to a power tool and/or to a battery charger having a second general configuration, such as the "tower" configuration or the "slide-on" configuration, respectively. In other embodiments, the invention provides an adapter which is used to connect a battery having a first general configuration, such as the "slide-on" configuration or the "tower" configuration, and a first connecting structure to a power tool and/or to a battery charger having the same first general configuration and a second connecting structure different than the first connecting structure.

More particularly, the invention provides an electrical combination comprising an electrical component including a component housing, a battery electrically connectable to the electrical component to transfer power between the electrical component and the battery, and an adapter separate from and connectable between the battery and the component housing to support the battery on the component housing and, preferably, to electrically connect the battery to the electrical component.

Also, the invention provides an electrical combination comprising a power tool including a housing and an electric motor supported by the housing and operable to drive a tool element, a battery electrically connectable to the motor to selectively power the motor, and an adapter separate from and connectable between the battery and the housing to support the battery on the housing and, preferably, to electrically connect the battery to the motor.

In addition, the invention provides an electrical combination comprising a battery charger including a charger housing and a charging circuit supported by the charger housing and selectively connectable with a power source, a battery electrically connectable with a charging circuit such that the charging circuit selectively supplies power to the battery to charge the battery, and an adapter separate from and connectable between the housing and the battery to support the battery on the housing and, preferably, to electrically connect the battery to the charging circuit.

Preferably, the battery includes a terminal assembly and the electrical component includes a component terminal assembly. The adapter preferably includes a first adapter terminal assembly electrically connectable to the battery terminal assembly and a second adapter terminal assembly electrically connectable to the component terminal assembly to electrically connect the battery to the electrical component.

In one embodiment, the component housing defines an opening and the adapter includes an insertion portion which is insertable into the opening to support the adapter on the component housing. The electrical component preferably includes a component terminal assembly supported in the opening, and the adapter includes an adapter terminal assembly supported on the insertion portion. The adapter terminal assembly is electrically connected to the component terminal assembly when the insertion portion is inserted into the opening.

The adapter preferably includes a battery support portion connected to the insertion portion, and the battery is connectable to and supportable by the support portion. Preferably, the battery is connectable to the support portion along a battery attachment axis generally perpendicular to the opening axis.

The battery may be selectively connectable to the support portion along the battery attachment axis in a first direction, in which the battery is supported in a first orientation relative to the housing, and in a second direction, in which the battery is supported in a second orientation relative to the housing. The battery is preferably selectively connectable to the support portion in the first direction, in which the battery is supported in a first orientation relative to the adapter, and in the second direction, in which the battery is supported in a second orientation relative to the adapter.

The adapter preferably includes a forward first terminal assembly and a rearward first terminal assembly. In the first orientation, the battery terminal assembly is electrically connected to the forward first terminal assembly, and, in the second orientation, the battery terminal assembly is electrically connected to the rearward first terminal assembly.

Preferably, the battery has a first connection configuration, and the housing has a second connection configuration different than the first connection configuration. The adapter preferably includes a first connecting portion having the first connection configuration and a second connecting portion having the second connection configuration. The first connecting portion is connectable with a battery to connect the battery to the adapter, and the second connecting portion is connectable with the housing to connect the adapter to the housing.

The connection configurations of the battery and the electrical component may be different general configurations ("slide-on" or "tower") or may be the same general configuration but with different physical connecting structure and/or with different electrical connecting structure. In one embodiment, one connection configuration is a "tower" configuration, and the other configuration is a "slide-on" configuration. In other embodiments, the first connection configuration is a first "tower" configuration or a first "slide-on" configuration, and the second configuration is a second "tower" configuration or a second "slide-on" configuration, respectively, having different physical connecting structure and/or different electrical connecting structure.

The combination preferably further comprises a first locking assembly for locking the battery to the adapter and a second locking assembly for locking the adapter to the component housing.

Further, the invention provides an electrical combination comprising a power tool including a tool housing and an electric motor supported by the tool housing and operable to drive a tool element, a battery charger including a charger housing and a charging circuit supported by the charger housing and selectively electrically connectable with a power source, a battery, and an adapter separate from and connectable between the battery and one of the power tool and the battery charger to support the battery on the one of the power tool and the battery charger and to transfer power between the battery and the one of the power tool and the battery charger.

In one embodiment, the adapter is alternatively connectable between the battery and the power tool to support the battery on the power tool and between the battery and the battery charger to support the battery on the battery charger. In another embodiment, the battery is connectable without the adapter to the other of the power tool and the battery charger.

In addition, the invention provides an electrical combination comprising a power tool manufactured by a first power tool company, the power tool including a tool housing and an electric motor supported by the tool housing and operable to drive a tool element, a battery manufactured by a second power tool company, and an adapter separate from and connectable between the battery and the tool housing to support the battery on the tool housing.

Further, the invention provides an adapter for use with an electrical component and a battery, the electrical component including a component housing, the battery being electrically connectable to the electrical component to transfer power between the electrical component and the battery. The adapter comprises an adapter housing separate from and connectable between the battery and the component housing to support the battery on the component housing, and an adapter electrical assembly electrically connectable between the electrical component and the battery to selectively transfer power between the electrical component and the battery. The electrical component can be manufactured by a first power tool company and the battery can be manufactured by a second power tool company.

The present invention provides an electrical combination including a battery adapter having a first connecting portion for engagement with an electrical component, such as, for example, a power tool, and a second connecting portion for engagement with a battery, the first connecting portion having a different configuration than the second connecting portion. The electrical combination may also include an electrical circuit extending through the adapter between the first connecting portion and the second connecting portion and being electrically connectable with the electrical component and the battery.

In addition, the present invention provides an electrical combination including a battery adapter having a housing, a first connecting portion supported on the housing for engagement with an electrical component, such as, for example, a power tool, a second connecting portion supported on the housing for engagement with a battery, and a latch positioned adjacent to the first connecting portion and being moveable relative to the housing between a locked position, in which the latch is lockingly engageable with the power tool, and an unlocked position, in which the latch is movable away from the power tool, the latch being prevented from moving from the locked position toward the unlocked position when a battery is supported on the second connecting portion.

The present invention also provides an electrical combination including a power tool having a housing supporting a motor, which is operable to drive a tool element. The electrical combination also includes a battery and an adapter supportable on the housing of the power tool and electrically connectable to the power tool and the battery such that the adapter transfers electrical power between the battery and the motor. The adapter has a locking arrangement engageable with the battery for preventing the adapter from being removed from the power tool housing while the battery is connected to the adapter.

In some embodiments, the invention provides an electrical combination including an electrical component including a component housing, and an electrical circuit supported by the component housing. The electrical combination can also include a battery, and an adapter having a locking arrangement and being electrically connectable to the power tool and the battery such that the adapter transfers electrical power between the battery and the electric circuit of the power tool. The locking mechanism can be movable between a locked position, in which the locking mechanism secures the adapter to the power tool, and an unlocked position, in which the adapter is removable from the power tool. The locking mechanism can be maintained in the locked position when the battery is connected to the adapter.

The present invention also provides a method of operating an electrical combination including a power tool having a housing supporting a motor, a battery, and an adapter having a locking arrangement. The method includes the acts of connecting the battery to the adapter and connecting the adapter to the power tool, transferring electrical power from the battery to the electric circuit of the power tool, operating the motor to drive a tool element, and moving the locking arrangement relative to the adapter between an unlocked position, in which the locking arrangement secures the adapter to the housing of the power tool, and a locked position, in which the adapter is removable from the housing of the power tool. The battery prevents movement of the locking arrangement toward the unlocked position, when the battery is secured to the adapter.

One independent advantage of the present invention is that, with some embodiments of the present adapter, a battery having one configuration, such as a "slide-on" configuration, may be used with a power tool having another configuration, such as a "tower" configuration.

Another independent advantage of the present invention is that, with some embodiments of the present adapter, a battery having one configuration, such as a "slide-on" configuration, may be charged by a battery charger having another configuration, such as a "tower" configuration.

Yet another independent advantage of the present invention is that, with some embodiments of the present adapter, a battery having one general configuration, such as a "slide-on" configuration or a "tower" configuration, and a first connecting structure may be used with a power tool having the same general configuration, such as the "slide-on" configuration or the "tower" configuration, respectively, and a second connecting structure different than the first connecting structure.

A further independent advantage of the present invention is that, with some embodiments of the present adapter, a battery having one general configuration, such as a "slide-on" configuration or a "tower" configuration, and a first connecting structure may be charged by a battery charger having the same general configuration, such as the "slide-on" configuration or the "tower" configuration, respectively, and a second connecting structure different than the first connecting structure.

Other independent features and independent advantages of the present invention will become apparent to those skilled in the art upon review of the following detailed description, claims and drawings.

BRIEF DESCRIPTION OF THE DRAWINGS

FIGS. 1A and 1B are perspective views of an electrical combination including the adapter embodying the invention and illustrating the connection of the adapter between an electrical component, such as a power tool, and a battery.

FIGS. 3A and 3B are schematic diagrams illustrating the connection of a battery having a "slide-on" configuration to an electrical component having a "tower" configuration.

FIGS. 4A and 4B are schematic diagrams similar to FIGS. 3A and 3B.

FIGS. 5A and 5B are views of an alternate embodiment of an adapter embodying the invention.

FIGS. 6A and 6B are schematic diagrams illustrating the connection of a battery having a "tower" configuration to an electrical component having a "slide-on" configuration.

FIGS. 7A and 7B are schematic diagrams similar to FIGS. 6A and 6B.

FIGS. 8A and 8B are views of another alternate embodiment of an adapter embodying the invention.

FIGS. 9A and 9B are schematic diagrams illustrating the connection of a "slide-on" battery having a first connecting structure to a "slide-on" electrical component having a second connecting structure.

FIG. 10 is a side view of yet another alternate embodiment of an adapter embodying the invention.

FIGS. 11A and 11B are schematic diagrams illustrating the connection of a "tower" battery having a first connecting structure to a "tower" electrical component having a second connecting structure.

FIG. 17 is an exploded perspective view of a portion of the electrical combination of FIG. 16 and illustrating the connection of the battery and the power tool.

Figure 2B:
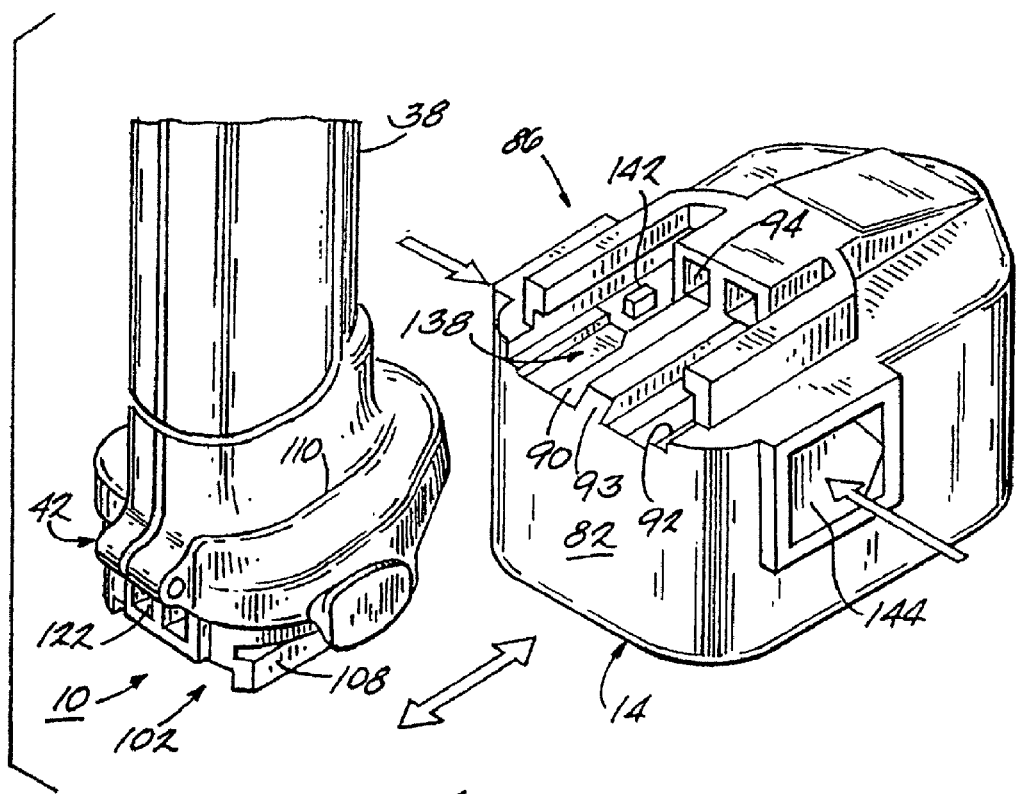
FIGS. 2A and 2B are perspective views of another electrical combination including the adapter and illustrating connection of the adapter between another electrical component, such as a battery charger, and the battery.

Before at least one embodiment of the invention is explained in detail, it is to be understood that the invention is not limited in its application to the details of the construction and arrangements of the components set forth in the following description or illustrated in the drawings. The invention is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and variations thereof herein are used broadly and encompass direct and indirect connections and couplings. In addition, the terms "connected" and "coupled" and variations thereof are not restricted to physical or mechanical connections or couplings.

DETAILED DESCRIPTION

Figure 2A:
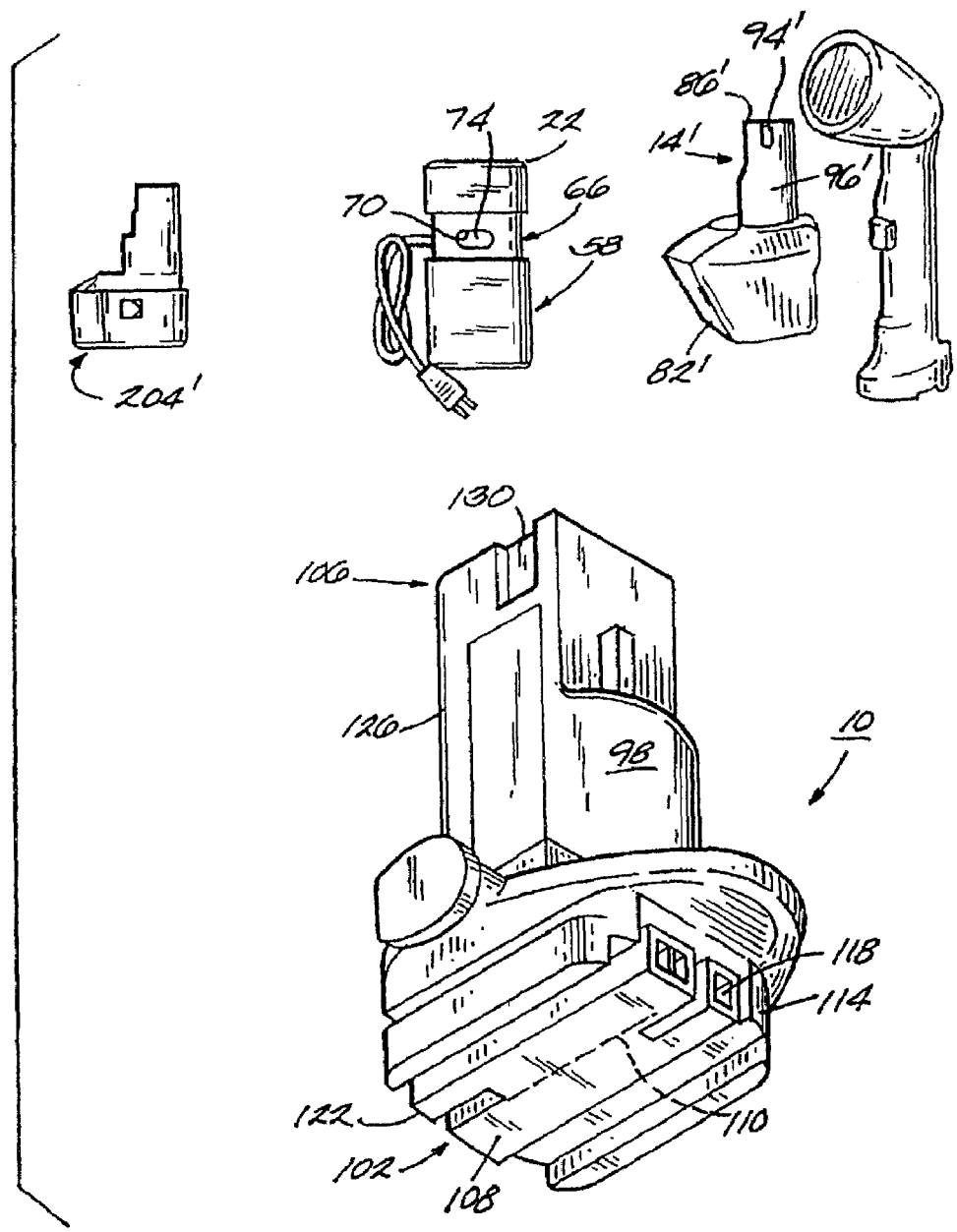

An electrical combination including an adapter 10 for a power tool battery 14 is illustrated in FIGS. 1-2. The electrical combination also includes an electrical component, such as a power tool 18 (partially shown in FIGS. 1A and 1B) and/or a battery charger 22 (shown in FIGS. 2A and 2B). It should be understood that the electrical component may be any type of electrical component, such as, for example, a radio, audio device, or flashlight, which is usable with a power tool battery.

As shown in FIGS. 1A and 1B, the power tool 18 includes a tool housing 26 and an electric motor 30 (schematically illustrated in FIGS. 3B and 4B) supported by the tool housing 26 and operable to drive a tool element (not shown). An electrical circuit 34 (schematically illustrated in FIGS. 3B and 4B) is electrically connected with the motor 30 to electrically connect the motor 30 to a power source, such as the battery 14. The tool housing 26 also includes a handle portion 38.

The power tool 18 includes a connection configuration 42 for connecting the power tool 18 to a battery. In the illustrated embodiment, the connection configuration 42 of the power tool 18 is a "tower" configuration. A portion of the tool housing 26, such as the handle portion 38, defines an opening 46 extending along an opening axis 50. In this configuration, a motor terminal assembly 54 (schematically illustrated in FIGS. 3B and 4B) is supported in the opening 46 and is electrically connected to the electrical circuit 34 and to the motor 30. Typically, the "tower" power tool 18 is used with a "tower" battery 14', shown in FIGS. 1A and 2A and described below in more detail, without the use of an adapter.

As shown in FIG. 1A, a second power tool 18' includes a second connection configuration 42' which is different than the connection configuration 42 of the first power tool 18. The second connection configuration 42' is a "slide-on" connection configuration. In the "slide-on" connection configuration 42', the handle portion 38' includes (see FIG. 5A) a support portion 56' on which a motor terminal assembly 54' is supported. The "slide-on" battery 14, shown in FIGS. 1A, 1B and 2A and described below in more detail, may be used with the "slide-on" power tool 18' without the use of an adapter.

As shown in FIG. 2A, the battery charger 22 includes a charger housing 58 and a charging circuit 62 (schematically illustrated in FIGS. 3A and 4A) supported by the charger housing 58 and electrically connectable to a power source (not shown) and to a battery to charge the battery. In the illustrated embodiment, the battery charger 22 includes a "tower" connection configuration 66, which is similar to the connection configuration 42 of the "tower" power tool 18. In the "tower" connection configuration 66, the charger housing 58 defines an opening 70 extending along an opening axis 74. A charger terminal assembly 78 (schematically illustrated in FIGS. 3A and 4A) is supported in the opening 70 and is electrically connected to the charging circuit 62. Typically, the "tower" charger 22 is used to charge the "tower" battery 14' (shown in FIGS. 1A and 2A) without the use of an adapter.

As shown in FIG. 2B, a second battery charger 22' includes a connection configuration 66' which is different than the connection configuration 66 of the first battery charger 22. The second connection configuration 66' is a "slide-on" connection configuration, which is similar to the connection configuration 42' of the "slide-on" power tool 18'. The "slide-on" connection configuration 66' includes (see FIG. 8A) a support portion 80' and charger terminal assembly 78' supported on the support portion 80'. Typically, the "slide-on" battery 14 can be charged by the "slide-on" charger 22' without the use of an adapter.

As shown in FIGS. 1B and 2B, the battery 14 includes a battery housing 82 supporting one or more rechargeable battery cells (not shown). The battery 14 has a connection configuration 86 which is different than the connection configuration 42 of the power tool 18 and different than the connection configuration 66 of the battery charger 22. In the illustrated embodiment, the connection configuration 86 is a "slide-on" connection configuration. In the "slide-on" connection configuration 86, the battery housing 82 includes a connecting portion 90 having grooves 92 and projections 93, and a battery terminal assembly 94 is supported on the connecting portion 90. The battery terminal assembly 94 is electrically connected to the rechargeable battery cell(s) and is connectable, with the adapter 10, to the motor 30 to supply power to the motor 30 and to the charging circuit 62 such that the charging circuit 62 selectively supplies power to charge the battery 14. As discussed above, the "slide-on" battery 14 may be used with the "slide-on" power tool 18' and may be charged by the "slide-on" battery charger 22' without the use of an adapter.

As shown in FIG. 2A, the second battery 14' includes a different connection configuration 86' than the connection configuration 86 of the battery 14. In this embodiment, the connection configuration 86' is a "tower" connection configuration and includes "tower" or insertion portion 96' on which a battery terminal assembly 94' is supported. As discussed above, the "tower" battery 14' may be used with the "tower" power tool 18 and may be charged by the "tower" battery charger 22 without the use of an adapter.

As shown in FIGS. 1-2, the adapter 10 is connectable between the "slide-on" battery 14 and at least one of the "tower" power tool 18 and the "tower" battery charger 22. The adapter 10 includes an adapter housing 98 providing a first connecting portion 102, for connecting the adapter 10 to the battery 14, and a second connecting portion 106, for connecting the adapter 10 to the power tool 18 and/or to the battery charger 22.

In the illustrated embodiment, the first connecting portion 102 provides a "slide-on" connection configuration similar to the "footprint" of the "slide-on" power tool 18' and/or the "slide-on" charger 22'. The first connecting portion 102 includes a support portion 108 defining a battery attachment axis 110. The support portion 108 includes axially-extending grooves 112 and projections 113. The first connecting portion 102 also includes a first adapter terminal assembly 114 which is electrically connectable to the battery terminal assembly 94. In the illustrated embodiment, the "slide-on" battery 14 is slidably connectable to the support portion 108 in a first direction along the axis 110.

In the illustrated embodiment, the battery 14 is selectively connectable to the adapter 10 to have a first orientation (shown in solid lines in FIG. 1B) relative to the adapter 10 and in a second direction along the axis 110 to have a second orientation (reversed from the position shown in solid lines in FIG. 1B) relative to the adapter 10. To accommodate the first and second orientations of the battery 14 relative to the adapter 10, the first adapter terminal assembly 114 includes a forward (for the purposes of description) first adapter terminal assembly 118, which is electrically connectable to the battery terminal assembly 94 when the battery 14 is in the first orientation, and a rearward (for the purposes of description) first adapter terminal assembly 122, which is electrically connectable to the battery terminal assembly 94 when the battery 14 is in the second orientation.

As the battery 14 is connected to the first connecting portion 102, the grooves 92 and projections 93 on the support portion 90 of the battery 14 inter-engage with the grooves 112 and the projections 113 on the support portion 108 of the adapter 10. As the battery 14 is slid onto the support portion 108, the first adapter terminal assembly 114 is electrically connected to the battery terminal assembly 94.

In the illustrated embodiment, the second connecting portion 106 provides a "tower" connection configuration similar to the "footprint" of the "tower" battery 14'. The second connecting portion 106 includes a "tower" or insertion portion 126 to connect the adapter 10 to the "tower" power tool 18 and/or to the "tower" battery charger 22. The second connecting portion 106 also includes a second adapter terminal assembly 130, which is electrically connectable to the electrical component terminal assembly, such as the motor terminal assembly 54 and/or the charger terminal assembly 78, to electrically connect the adapter 10 to the electrical component, such as the motor 30 and/or the charging circuit 62.

As shown in FIGS. 3-4, the adapter 10 also includes an adapter electrical circuit 134 (schematically illustrated) to electrically connect the first adapter terminal assembly 114 to the second adapter terminal assembly 130. As shown in FIGS. 3-4, the adapter electrical circuit 134 includes electrical components and electrical structure to accommodate the differences between the electrical configuration of the battery 14 and battery terminal assembly 94 and the electrical configuration of the electrical component, such as the motor 30 and/or the charging circuit 62, and electrical component terminal assembly, such as the motor terminal assembly 54 and/or the charger terminal assembly 78.

As shown in FIGS. 1B and 2B, the electrical combination also includes a first locking assembly 138 for locking the battery 14 to the adapter 10. In the illustrated embodiment, the first locking assembly 138 includes a first locking member or moveable projection 142 supported on the battery 14 and a second locking member or recess 146 defined by the support portion 108. The moveable projection 142 is engageable in the recess 146 to lock the battery 14 to the adapter 10. The first locking assembly 138 also includes an actuator 144 for moving the projection 142 into and out of engagement with the recess 146. A spring (not shown) biases the projection 142 and the actuator 144 to a position in which the projection 142 engages the recess 146. It should be understood that, in other embodiments (not shown), the locking members 142 and 146 may be reversed and supported on the adapter 10 and the battery 14, respectively.

The electrical combination also includes (see FIG. 1A) a second locking assembly 150 for locking the adapter 10 to the power tool 18 and/or to the battery charger 22. The second locking assembly includes a first locking member or moveable projection 154 supported on the adapter 10 adjacent the support portion 108 and a second locking member for recess 158 defined by the handle portion 38 of the power tool 18. An actuator 156 moves the projection 154 into and out of engagement with the recess 158. A spring (not shown) biases the projection 154 and the actuator 156 to a position in which the projection 154 engages the recess 158. It should also be understood that, in other embodiments (not shown), the locking members 154 and 158 may be reversed and supported on the handle portion 38 and the adapter 10, respectively.

While, in the illustrated embodiment, the adapter 10 is not locked to the battery charger 22 when used with the battery charger 22, it should be understood that, in other embodiments (not shown), a similar locking arrangement may be provided to lock the adapter 10 to the battery charger 22.

To use the "slide-on" battery 14 with the "tower" power tool 18, the adapter 10 is connected between the battery 14 and the power tool 18. As shown in FIG. 1A, the insertion portion 126 of the adapter 10 is inserted into the opening 46 in the handle portion 38 so that the adapter 10 is connected to the handle portion 38 and so that the second adapter terminal assembly 130 is electrically connected with the motor terminal assembly 54. The actuator 156 is released when the insertion portion 126 is fully inserted into the opening 46. The spring moves the projection 154 into engagement with the recess 158 to lock the adapter 10 to the power tool 18.

As shown in FIG. 1B, the battery 14 is then connected to the adapter 10. The battery 14 is slid along the axis 110 so that the connecting portion 90 is connected to the support portion 108. The grooves 92 and 112 and the projections 93 and 113 are inter-engaged to connect the battery 14 to the adapter 10. When the battery 14 has been slid to its furthest extent on the support portion 108, the actuator 144 is released so that the projection 142 engages the recess 146 to lock the battery 14 to the adapter 10. As the battery 14 is slid onto the support portion 108, the first adapter terminal assembly 114 is electrically connected to the battery terminal assembly 94.

As shown in solid lines in FIG. 1B, the battery 14 is in the first orientation relative to the adapter 10 and relative to the power tool 18. In this orientation, the forward first adapter terminal assembly 118 is electrically connected with the battery terminal assembly 94. Once the battery 14 is connected to the adapter 10 and the adapter 10 is connected to the power tool 18, the adapter electrical circuit 134 connects the battery 14 to the motor 30. The power tool 18 may then be operated under the power of the battery 14.

In the reverse position from the position shown in solid lines in FIG. 1B, the battery 14 may be connected to the adapter 10 in the second orientation. In the second orientation, the rearward first adapter terminal assembly 122 is electrically connected to the battery terminal assembly 94.

To remove the battery 14, the actuator 144 is depressed so that the projection 142 is moved out of the recess 146. The battery 14 is then slid along the axis 110 so that the connecting portion 90 is disengaged from the support portion 108. To remove the adapter 10 from the power tool 18, the actuator 156 is depressed so that the projection moves out of engagement with the recess 158. The adapter 10 is then moved outwardly so that the tower portion 126 is removed from the opening 46.

To charge the "slide-on" battery 14 with the "tower" charger 22, the adapter 10 is used to connect the battery 14 to the charger 22. The battery 14 is connected to the adapter 10 as described above. The battery 14 and the adapter 10 are then connected to the charger 22. The tower portion 126 is inserted into the opening 70 so that the second adapter terminal assembly 130 is electrically connected with the charger terminal assembly 78 to electrically connect the battery 14 to the charging circuit 62. The "slide-on" battery 14 may then be charged by the "tower" charger 22.

In the embodiment illustrated in FIGS. 1-4, the adapter 10 enables a battery having one general configuration, such as the "slide-on" battery 14, to be used with a power tool having another general configuration, such as the "tower" power tool 18. The adapter 10 also enables a battery having one general configuration, such as the "slide-on" battery 14, to be charged by a battery charger having another general configuration, such as the "tower" charger 22.

An alternate embodiment of an adapter 10' is illustrated in FIGS. 5-7. Common elements are identified by the same reference number "'".

In this alternate embodiment, the adapter 10' enables a "tower" battery 14' to be used with a "slide-on" power tool 18' and/or to be charged by a "slide-on" charger 22'. The adapter 10' an adapter housing 98' providing a first connecting portion 102', for connecting the adapter 10' to the battery 14', and a second connecting portion 106', for connecting the adapter 10' to the power tool 18' and/or to the charger 22'.

In this illustrated embodiment, the first connecting portion 102' provides a "tower" connection configuration similar to the "footprint" of the "tower" power tool 18 and/or the "tower" charger 22. The adapter housing 98' defines an opening 162 extending along an opening axis 166. The insertion portion 96' of the "tower" battery 14' is received in the opening 162 to support the battery 14' on the adapter 10'. A first adapter terminal assembly 114' is supported in the opening 162 and is electrically connectable with the battery terminal assembly 94'.

In this illustrated embodiment, the second connecting portion 106' provides a "slide-on" connection configuration similar to the "footprint" of the "slide-on" battery 14. The adapter housing 98' includes a support portion 170 defining an adapter attachment axis 174. The support portion 170 of the adapter 10' has a construction which is complementary to the construction of the support portion 56' of the "slide-on" power tool 18' and/or to the support portion 80' of the "slide-on" charger 22'. The second connecting portion 106' also includes a second adapter terminal assembly 130', which is electrically connectable to the electrical component terminal assembly, such as the motor terminal assembly 54' and/or the charger terminal assembly 78', to electrically connect the adapter 10' to the electrical component, such as the motor 30' and/or the charging circuit 62'.

As shown in FIGS. 6-7, the adapter 10' also includes an adapter electrical circuit 134' (schematically illustrated) to electrically connect the first adapter terminal assembly 114' to the second adapter terminal assembly 130'. As shown in FIGS. 6-7, the adapter electrical circuit 134' includes electrical components and electrical structure to accommodate the differences between the electrical configuration of the battery 14' and battery terminal assembly 94' and the electrical configuration of the electrical component, such as the motor 30' and/or the charging circuit 62', and electrical component terminal assembly, such as the motor terminal assembly 54' and/or the charger terminal assembly 78'.

In this alternate embodiment, the electrical combination also includes a first locking arrangement (not shown) for locking the adapter 10' to the battery 14' and a second locking arrangement (not shown) for locking the adapter 10' to the power tool 18' and/or to the charger 22'.

Another alternate embodiment of an adapter 200 is illustrated in FIGS. 8-9. In this alternate embodiment, the adapter 200 enables a "slide-on" battery 204 having a different connecting structure to be used with the "slide-on" power tool 18' and/or to be charged by the "slide-on" charger 22'.

The battery 204 has a "slide-on" connection configuration 208 (shown in FIG. 8A) having a different connecting structure than the connection configuration 86 (shown in FIGS. 1B and 2B) of the first "slide-on" battery 14. As shown in FIG. 8A, the connection configuration 208 includes a connecting portion 212 having a generally T-shaped cross-section. The connecting portion 212 includes a battery projection 213 defining a battery groove 214. A battery terminal 216 is supported on the connecting portion 212.

The support portion 56' of the "slide-on" power tool 18' also has a T-shaped cross-section (similar to that of the first connecting portion 102 of the adapter 10). The support portion 56' includes a component projection 217 defining a component groove 218. Similarly, the support portion 80' of the "slide-on" charger 22' has a T-shaped cross-section and includes the projection 217 and the groove 218.

The adapter 200 includes a first connecting portion 220 having a generally C-shaped cross-section and connecting structure complementary to the connecting portion 212 of the battery 204. The first connecting portion 220 includes a first adapter projection 221 defining a first adapter groove 222. A first adapter terminal assembly 224 is supported on the first connecting portion 220 and is electrically connectable with the battery terminal 216.

The adapter 200 also includes a second connecting portion 228 having a generally C-shaped cross-section and connecting structure complementary to the support portion 56' of the power tool 18' and/or to the support portion 80' of the charger 22'. The second connecting portion 228 includes a second adapter projection 229 defining a second adapter groove 230. A second adapter terminal assembly 232 is supported on the second connecting portion 228 and is electrically connectable with the electrical component terminal assembly, such as the motor terminal assembly 54' and/or the charger terminal assembly 78', to electrically connect the adapter 200 to the electrical component, such as the motor 30' and/or the charging circuit 62'.

As shown in FIGS. 9A and 9B, the adapter 200 also includes an adapter electrical circuit 236 (schematically illustrated) to electrically connect the first adapter terminal assembly 224 to the second adapter terminal assembly 232. As shown in FIGS. 9A and 9B, the adapter electrical circuit 236 includes electrical components and electrical structure to accommodate the differences between the electrical configuration of the battery 204 and battery terminal assembly 216 and the electrical configuration of the electrical component, such as the motor 30' and/or the charging circuit 62', and electrical component terminal assembly, such as the motor terminal assembly 54' and/or the charger terminal assembly 78'.

The adapter 200 enables a battery having a first general configuration, such as the second "slide-on" battery 204, to be used with a power tool having the same general configuration, such as the "slide-on" power tool 18', and a different connecting structure (i.e., a physical connecting arrangement different than the physical connecting arrangement of the battery 204 and/or an electrical connecting arrangement different than the electrical connecting arrangement of the battery 204). The adapter 200 also enables the second "slide-on" battery 204 to charged by a battery charger having the same general configuration, such as the "slide-on" charger 22, and a different connecting structure.

Yet another alternate embodiment of an adapter 200' is illustrated in FIGS. 10-11. Common elements are identified by the same reference number """.

In this alternate embodiment, the adapter 200' enables a "tower" battery 204' having a different connecting structure to be used with the "tower" power tool 18 and/or to be charged by the "tower" charger 22. The battery 204' has a "tower" connection configuration 240 (shown in FIG. 10) having a different connecting structure than the connection configuration 86' (shown in FIGS. 1A and 2A) of the first "tower" battery 14'. As shown in FIG. 10, the connection configuration 240 includes a "tower" or insertion portion 244 on which a battery terminal 216' is supported.

As discussed above, the "tower" connection configuration 42 of the power tool 18 includes the opening 46 defined by the handle 38. The "tower" connection configuration 240 of the second "tower" battery 204' is not complementary to this connection configuration 42. For example, the insertion portion 244 may have different dimensions (diameter d, height h, cross-section, etc.) than the dimensions of the opening 46. Similarly, the "tower" connection configuration 240 of the second "tower" battery 204' is not complementary to the connection configuration 66 of the "tower" charger 22.

The adapter 200' accommodates the differences between the connection configuration 240 of the "tower" battery 204' and the connection configuration 42 of the "tower" power tool 18 and/or the connection configuration 66 of the "tower" charger 22. In some embodiments, the adapter 200' is preferably formed as a sleeve member to fit between the outer surface of the insertion portion 244 of the battery 204' and the inner surface of the opening 46 of the "tower" power tool 18 and/or of the opening 70 of the "tower" charger 22.

As shown in FIGS. 11A and 11B, the adapter 200' also includes an adapter electrical circuit 236' (schematically illustrated) to electrically connect a first adapter terminal assembly 224' to the second adapter terminal assembly 232'. As shown in FIGS. 11A and 11B, the adapter electrical circuit 236' includes electrical components and electrical structure to accommodate the differences between the electrical configuration of the battery 204' and battery terminal assembly 216' and the electrical configuration of the electrical component, such as the motor 30 and/or the charging circuit 62, and electrical component terminal assembly, such as the motor terminal assembly 54 and/or the charger terminal assembly 78.

Figure 12:
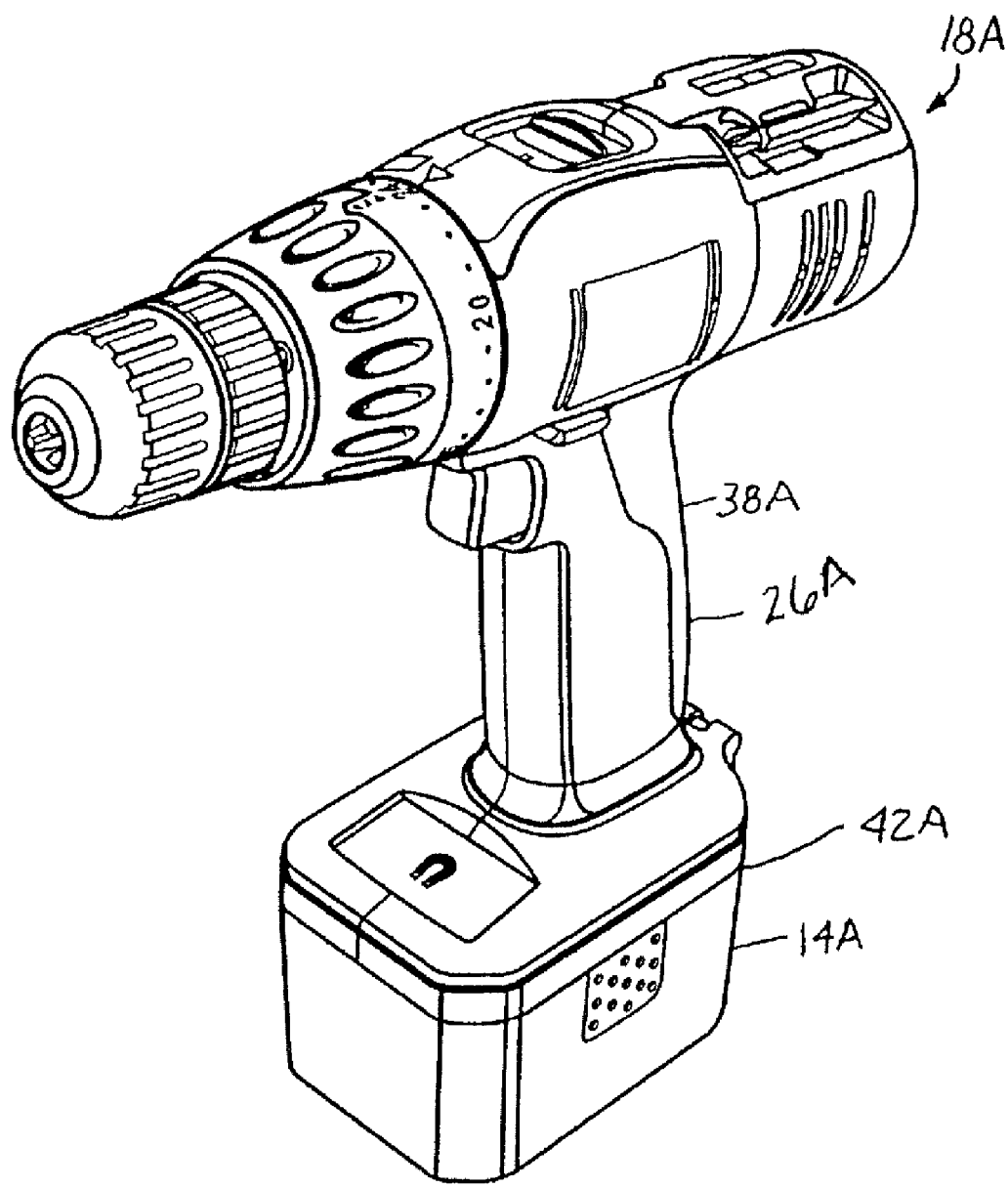
FIG. 12 is a perspective view of an alternate construction of an electrical combination including an electrical component, such as a power tool, and a battery.
Figure 13:
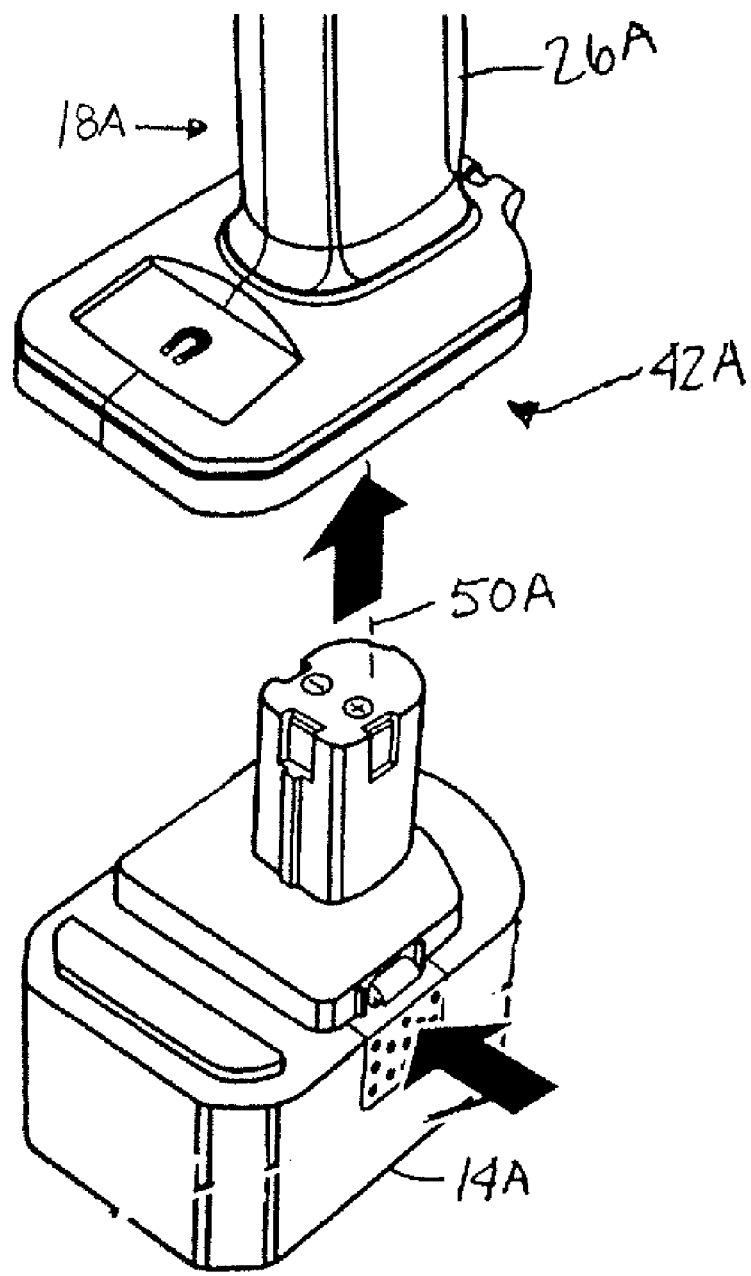
FIG. 13 is an exploded perspective view of a portion of the electrical combination of FIG. 12 and illustrating the connection of the battery and the power tool.
Figure 15:
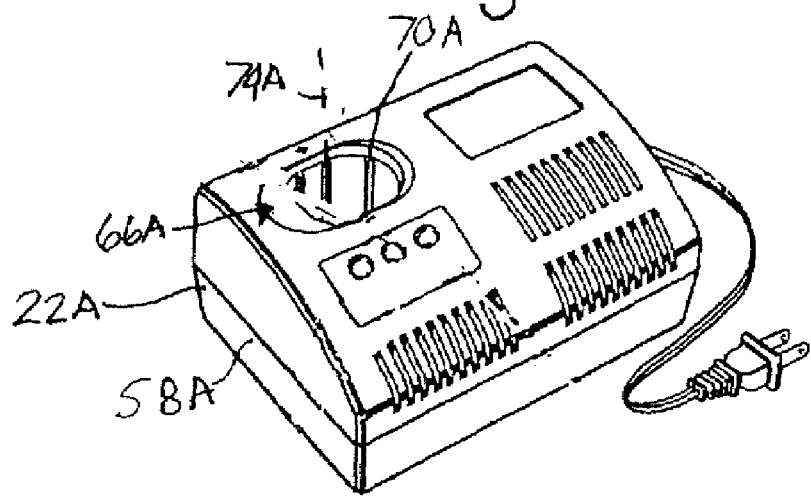
FIG. 15 is a perspective view of the electrical component of FIG. 14.
Figure 14:
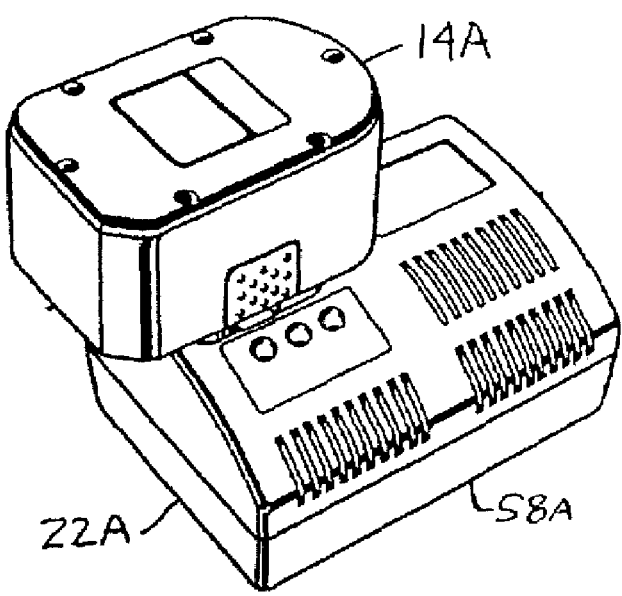
FIG. 14 is a perspective view of an electrical combination including an electrical component, such as a battery charger, and a battery.
Figure 16:
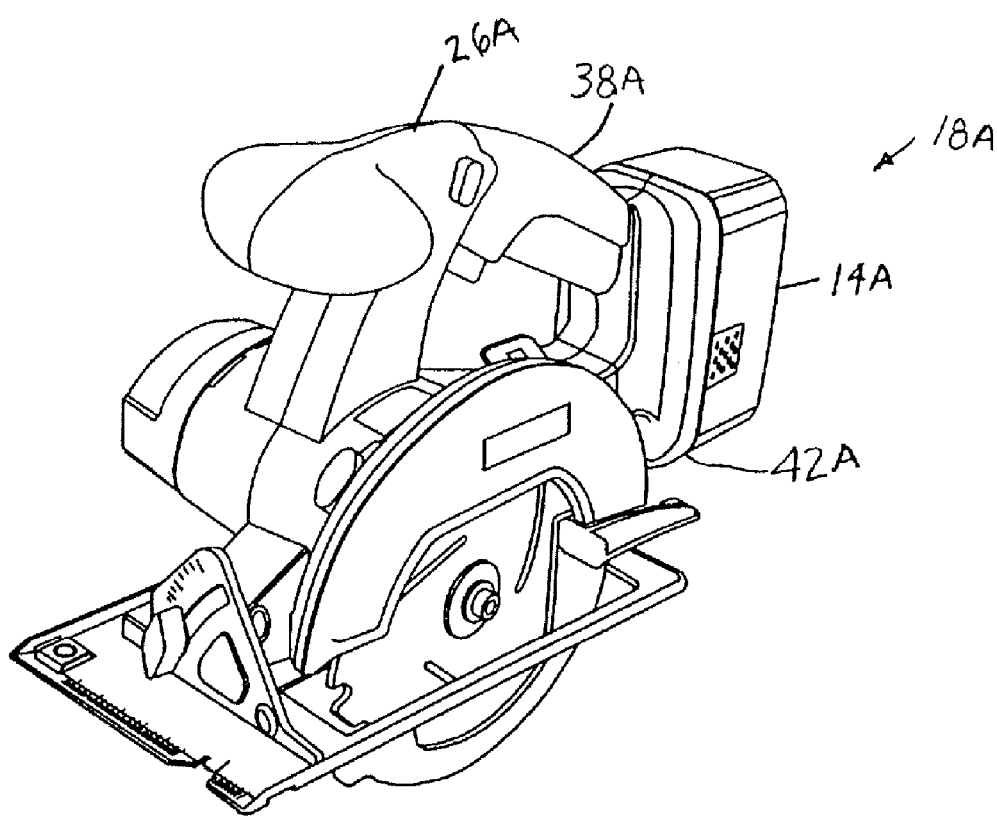
FIG. 16 is a perspective view of an alternate construction of an electrical combination including an electrical component, such as a power tool, and a battery.
Figure 19:
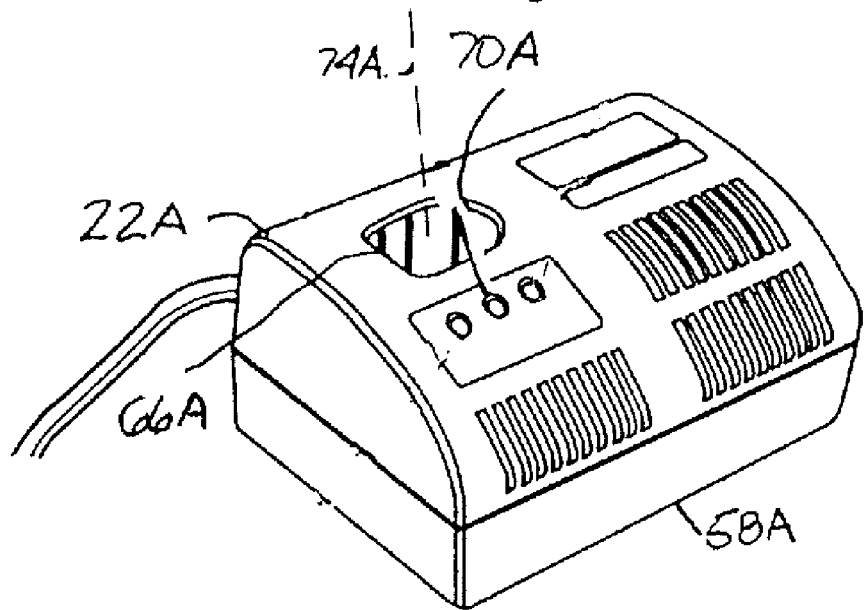
FIG. 19 is a perspective view of the electrical component of FIG. 18.
Figure 18:
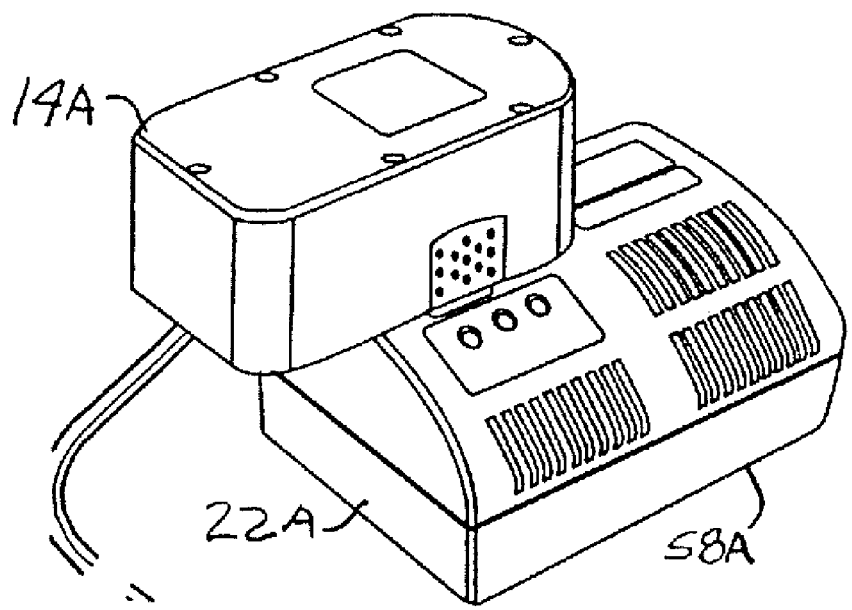
FIG. 18 is a perspective view of an electrical combination including an electrical component, such as a battery charger, and a battery.

In the illustrated construction of FIGS. 12-13, the electrical component is a power tool 18A, such as for example, a drill, a screw driver, a hammer, a hammer-drill, etc. In the illustrated construction of FIGS. 16-17, the electrical component is a power tool 18A, such as for example, a circular saw. In other constructions, the electrical component may be any type of electrical component, such as, for example, a radio, audio device or flashlight, which is usable with a power tool battery.

One or more of the power tool 18A, the power tool battery 14A and the battery charger 22A of FIGS. 12-19 can be manufactured by a first manufacturer and can have a first connecting configuration. One or more of the power tool 18, the power tool battery 14 and the battery charger 22 of FIGS. 1-11B can be manufactured by a second manufacturer and can have a second connecting configuration.

As shown in FIGS. 12-13 and 16-17, the power tool 18A can include a connecting configuration 42A for connecting the power tool 18A to a power tool battery 14A. In the illustrated constructions, the connecting configuration 42A of the power tool 18A is a "tower" configuration. A portion of the tool housing 26A, such as the handle portion 38A, defines an opening axis 50A. As mentioned above, in other constructions, the power tool can include a "slide-on" connection configuration and the battery can be a "slide-on" battery.

Typically, a "tower" power tool 18A is used with a "tower" battery 14A, and the power tool 18A and the battery 14A are typically manufactured by the same manufacturer (e.g., the first manufacturer). Similarly, a "slide-on" power tool is typically used with a "slide-on" battery, and the power tool and the battery are typically manufactured by the same manufacturer (e.g., the second manufacturer).

Power tool operators often own power tools, power tool batteries and battery chargers manufactured by two or more manufacturers and some of the power tools, power tool batteries and battery chargers include a "tower" connection configuration while others have a "slide-on" connection configuration. Operators have typically been prevented from operating power tools with batteries manufactured by other manufacturers. Similarly, operators have typically been prevented from charging battery packs with battery chargers manufactured by other manufacturers.

In some constructions, the adapter 10 of the present invention is operable to electrically and/or mechanically connect a power tool battery manufactured by a first manufacturer to a power tool manufactured by a second manufacturer. In some such embodiments, the adapter 10 is operable to connect a power tool battery having a first type of connecting configuration to a power tool having a second type of connecting configuration.

For example, in some constructions, the adapter 10 is operable to electrically and/or mechanically connect a "tower" power tool battery 14A manufactured by a first manufacturer to a "slide-on" power tool 18 manufactured by a second manufacturer. In other constructions, the adapter 10 is operable to electrically and/or mechanically connect a "tower" power tool battery 14A manufactured by a first manufacturer to a "tower" power tool 18A manufactured by a second manufacturer. In still other constructions, the adapter 10 is operable to electrically and/or mechanically connect a "slide-on" power tool battery 14 manufactured by a first manufacturer to a "slide-on" power tool 18 manufactured by a second manufacturer. In other constructions, the adapter 10 is operable to electrically and/or mechanically connect a "slide-on" power tool battery 14 manufactured by a first manufacturer to a "tower" power tool 18A manufactured by a second manufacturer. In these embodiments, electrical current can travel through the battery pack, the adapter 10 and into the power tool motor 30.

The battery charger 22A includes a charger housing 58A and a charging circuit supported by the charger housing 58A and electrically connectable to a power source (not shown) and to a battery to charge the battery. In the illustrated construction of FIGS. 14-15 and 18-19, the battery charger 22A includes a "tower" connection configuration 66A, which is similar to the connection configuration 42 of the "tower" power tool 18A.

In the illustrated "tower" configuration 66A, the charger housing 58A defines an opening 70A extending along an opening axis 74A. A charger terminal assembly (not shown) is supported in the opening 70A and is used to charge the "tower" battery 14A. As mentioned above, in other constructions, the battery charger 22A can include a "slide-on" connection configuration and the battery can be a "slide-on" battery.

In some constructions, the adapter 10 of the present invention is operable to electrically and/or mechanically connect a power tool battery 14A manufactured by a first manufacturer to a charger manufactured by a second manufacturer. In some such embodiments, the adapter 10 is operable to connect a power tool battery having a first configuration to a charger having a second configuration.

For example, in some constructions, the adapter 10 is operable to electrically and/or mechanically connect a "tower" power tool battery 14A manufactured by a first manufacturer to a "slide-on" charger 22 manufactured by a second manufacturer. In other constructions, the adapter 10 is operable to electrically and/or mechanically connect a "tower" power tool battery 14A manufactured by a first manufacturer to a "tower" battery charger 22A manufactured by a second manufacturer. In still other constructions, the adapter 10 is operable to electrically and/or mechanically connect a "slide-on" power tool battery 14 manufactured by a first manufacturer to a "slide-on" battery charger 22 manufactured by a second manufacturer. In other constructions, the adapter 10 is operable to electrically and/or mechanically connect a "slide-on" power tool battery 14A manufactured by a first manufacturer to a "tower" battery charger 22A manufactured by a second manufacturer. In these embodiments, electrical current can travel through the charger, the adapter 10 and into the battery pack.

Another alternate embodiment of an electrical combination including an adapter 310 for a power tool battery 314 is illustrated in FIGS. 20-23. The electrical combination also includes an electrical component, such as a power tool (partially shown in FIG. 20) 318 and/or a battery charger. In the illustrated embodiment, the power tool 318 is a drill or a screwdriver. In other embodiments, the power tool 318 may be another power tool, such as, for example, a band saw, reciprocating saw, hammer, hammer drill, sander, grinder, nibbler, shear, circular saw, etc. It should be understood that the electrical component may be any type of electrical component, such as, for example, a radio, audio device or flashlight, which is usable with a power tool battery.

The power tool 318 includes a tool housing 324 and an electric motor. An electric circuit is electrically connected with the motor and extends through the tool housing 324 to electrically connect the motor to a power source, such as the battery 314. The tool housing 324 also includes a handle portion 332.

Figure 20:
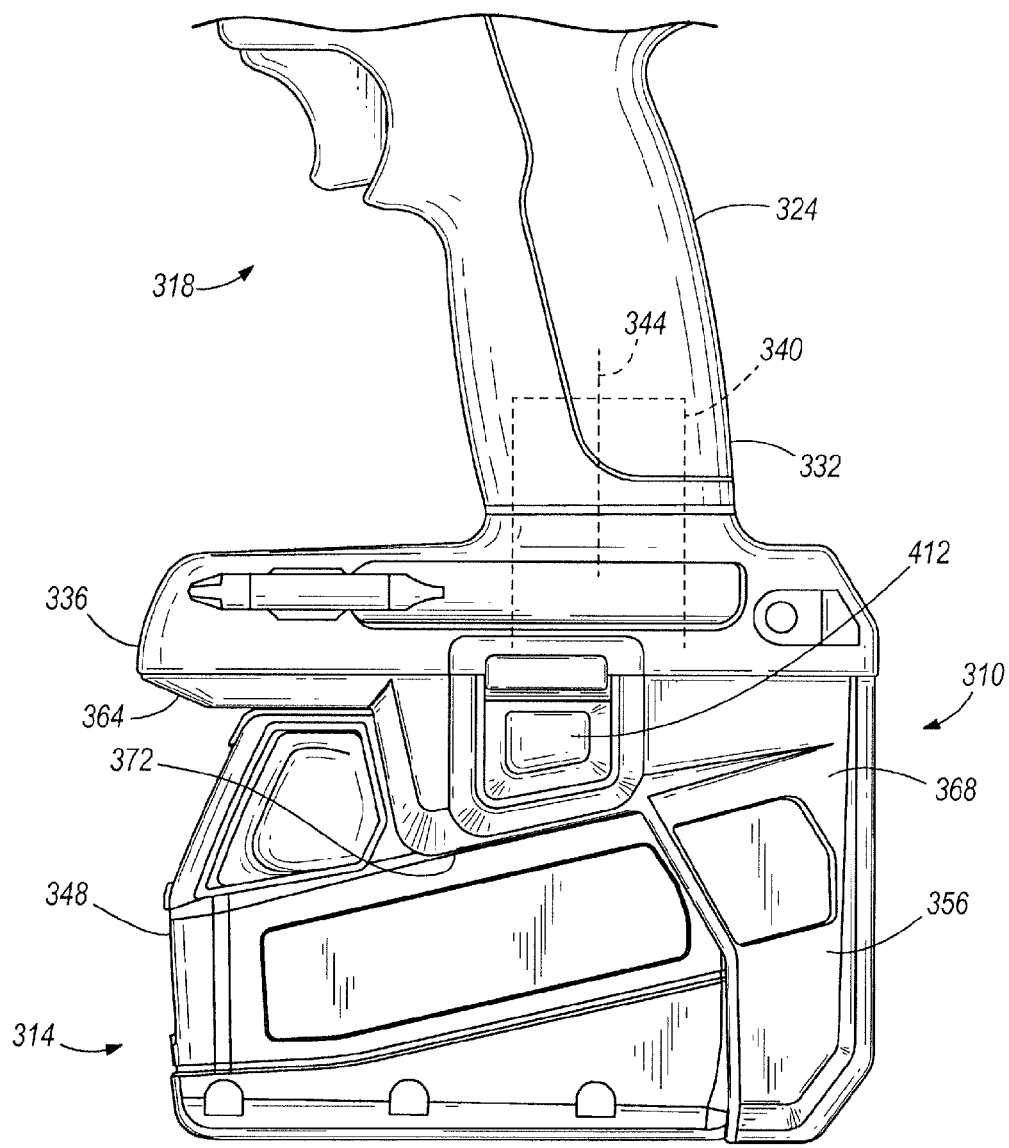
FIG. 20 is a side view of an electrical combination including an adapter embodying the invention and illustrating the connection of the adapter between an electrical component, such as a power tool, and a battery.

As shown in FIG. 20, the power tool 318 includes a connection configuration 336 for connecting the power tool 318 to a battery. In the illustrated embodiment, the handle portion 332 defines an opening 340 extending along an opening axis 344. Electrical terminals are positioned in the handle portion 332 for engagement with corresponding terminals of a battery positioned in the opening 340. The electrical terminals are electrically connected with the electrical circuit of the power tool to electrically connect the battery 314 to the electrical circuit of the power tool and the motor.

As shown in FIGS. 20-22 and 24-27, the battery 314 includes a battery housing 348 supporting one or more battery cells and having a connecting configuration 352, which is different than the connecting configuration 336 of the power tool 318. Specifically, the connecting configuration 352 of the battery 314 includes electrical terminals 353 positioned between guide rails 354. The terminals 353 are engageable with corresponding electrical terminals in a power tool and are electrically connected to the battery cells to supply energy from the battery cells to the power tool.

The adapter 310 is connectable between the battery 314 and the power tool 318. The adapter 310 of the illustrated embodiment includes a housing 356, which at least partially defines a battery receiving cavity 360. As shown in FIGS. 20-23, the housing 356 includes an upper wall 364, a rear wall 368, side walls 372 and a forwardly-facing opening 376. As also shown in FIGS. 20-23, the rear and side walls 368, 372 extend downwardly from the upper wall 364 to at least partially enclose the battery 314 supported on the battery receiving cavity 360.

Figure 21:
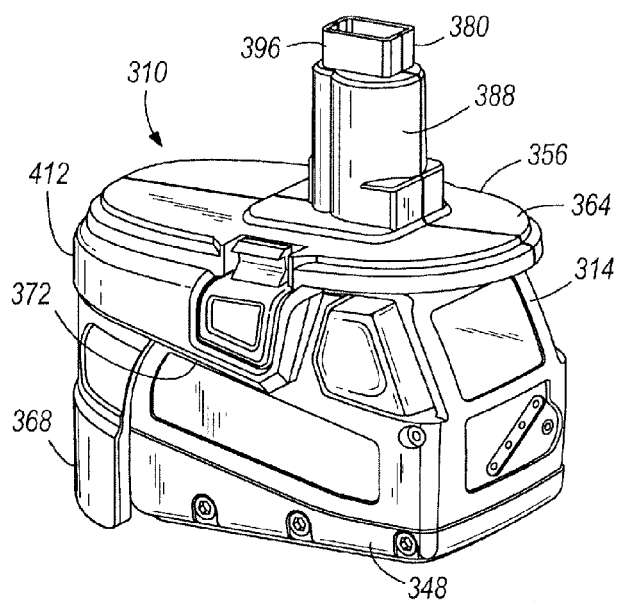
FIG. 21 is front perspective view of the adapter and the battery shown in FIG. 20.
Figure 23:
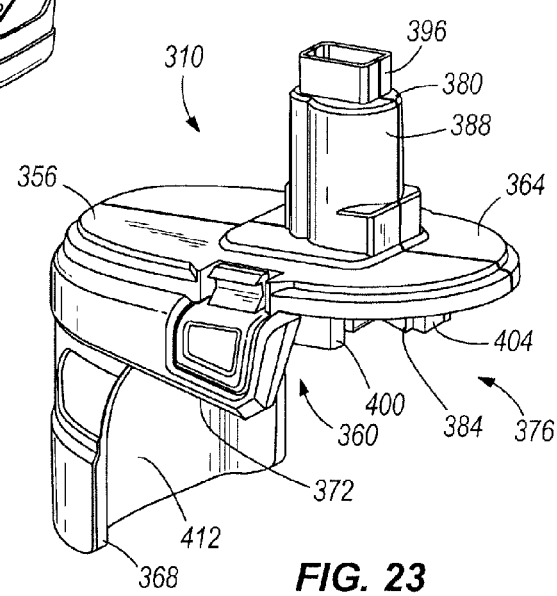
FIG. 23 is a front perspective view of the adapter shown in FIG. 20.
Figure 22:
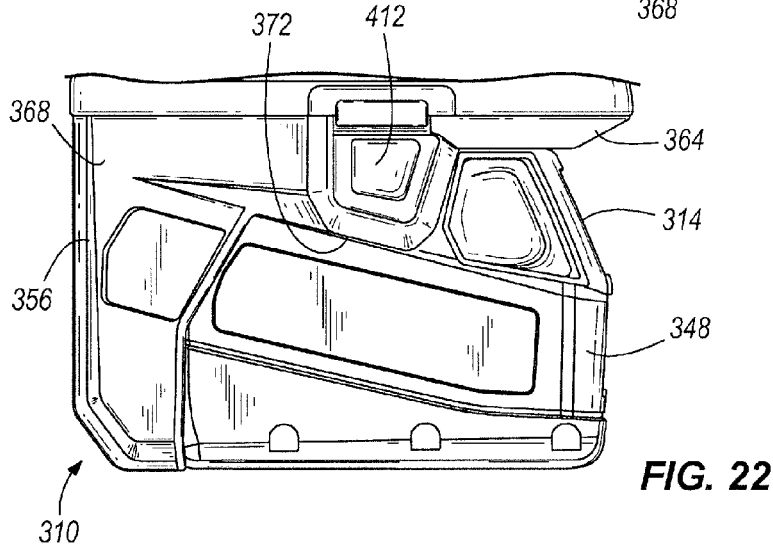
FIG. 22 is a side view of the adapter and the battery shown in FIG. 20.
Figure 24:
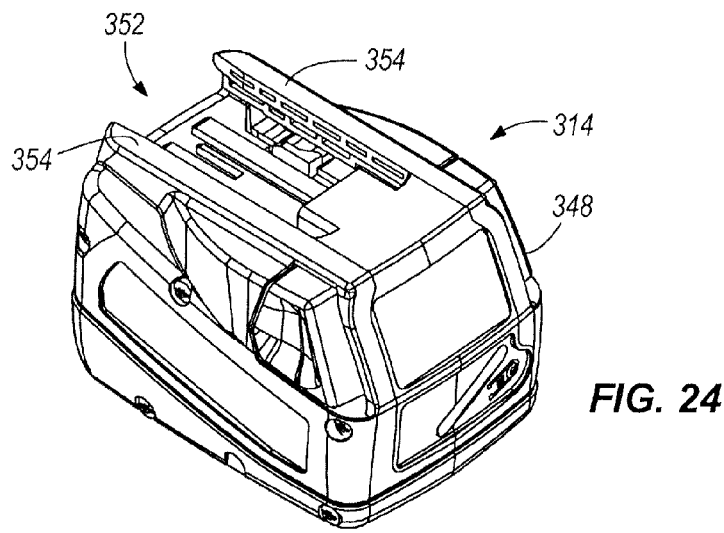
FIG. 24 is a top perspective view of the battery shown in FIG. 20.
Figure 25:
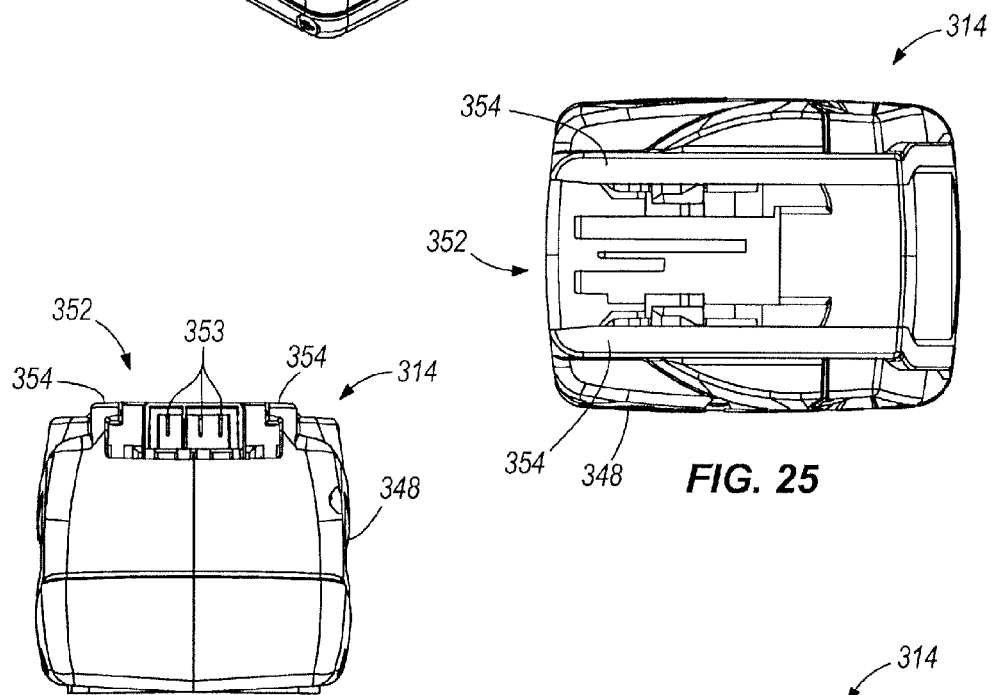
FIG. 25 is a top view of the battery shown in FIG. 20.
Figure 26:
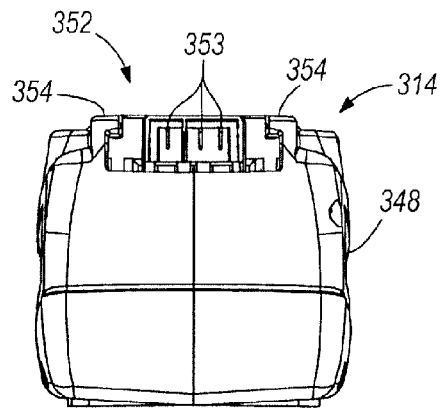
FIG. 26 is a rear view of the battery shown in FIG. 20.
Figure 27:
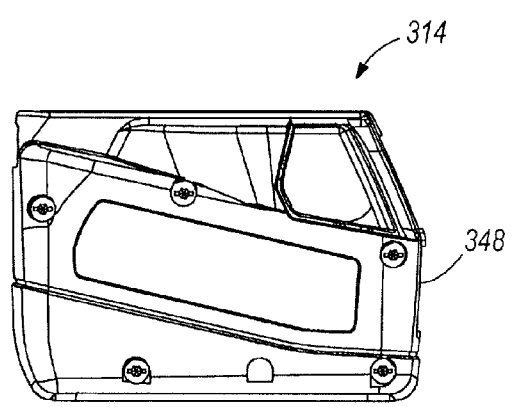
FIG. 27 is a side view of the battery shown in FIG. 20.
Figure 28:
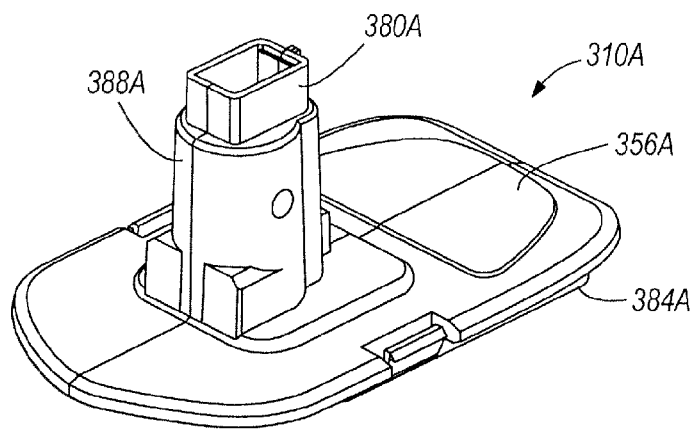
FIG. 28 is a top perspective view of another embodiment of the adapter.
Figure 29:
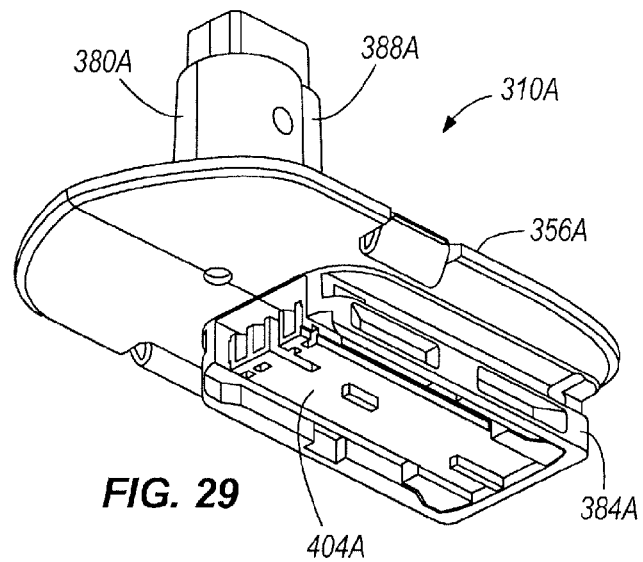
FIG. 29 is a bottom perspective view of the adapter shown in FIG. 28.
Figure 30:
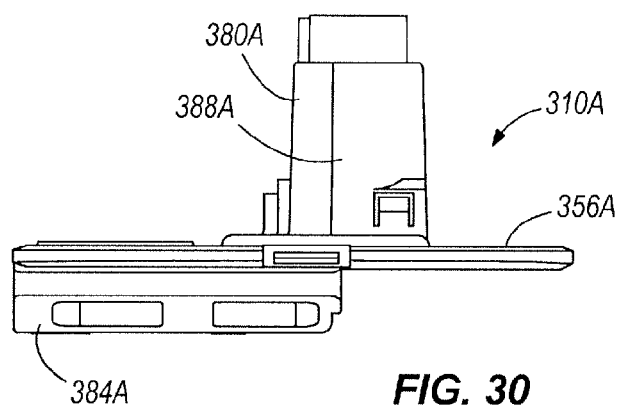
FIG. 30 is a side view of the adapter shown in FIG. 28.
Figure 31:
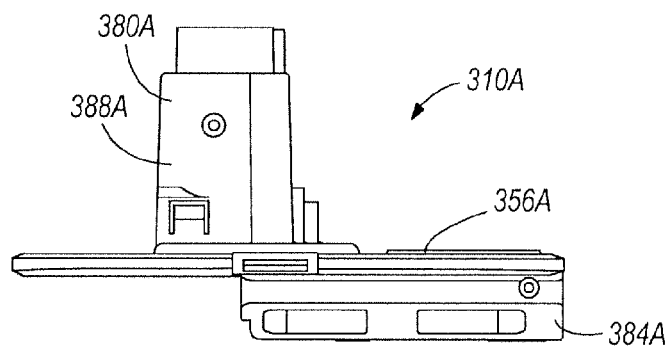
FIG. 31 is another side view of the adapter shown in FIG. 28.
Figure 32:
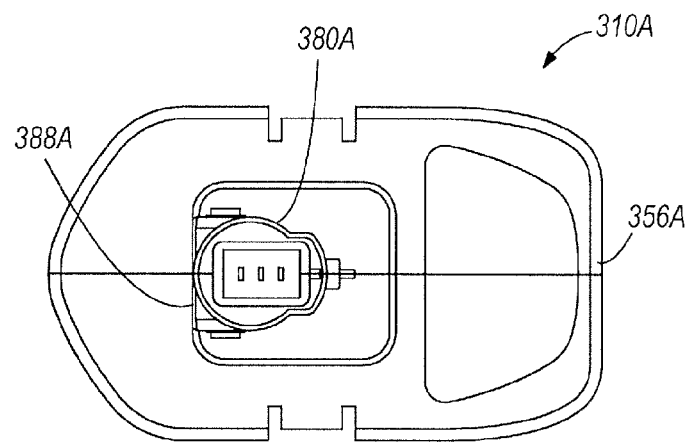
FIG. 32 is a top view of the adapter shown in FIG. 28.
Figure 33:
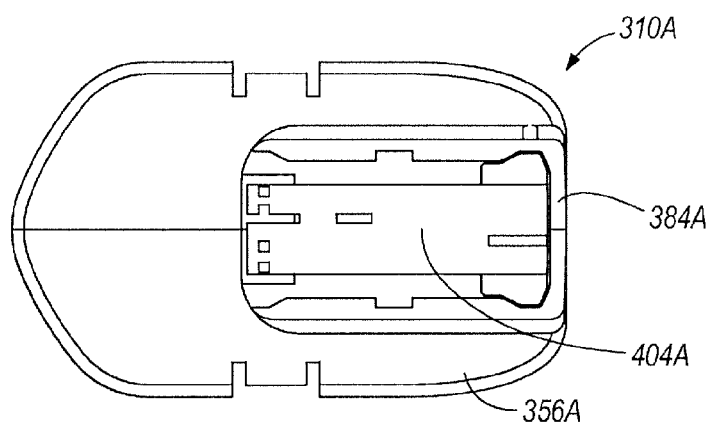
FIG. 33 is a bottom view of the adapter shown in FIG. 28.
Figure 35:
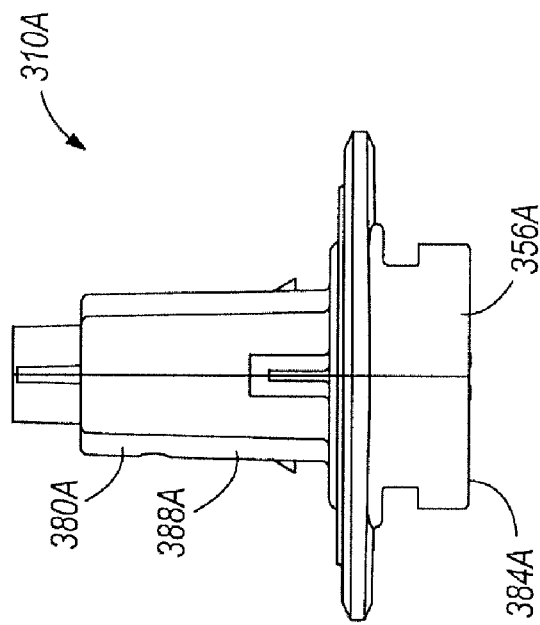
FIG. 35 is a rear view of the adapter shown in FIG. 28.
Figure 34:
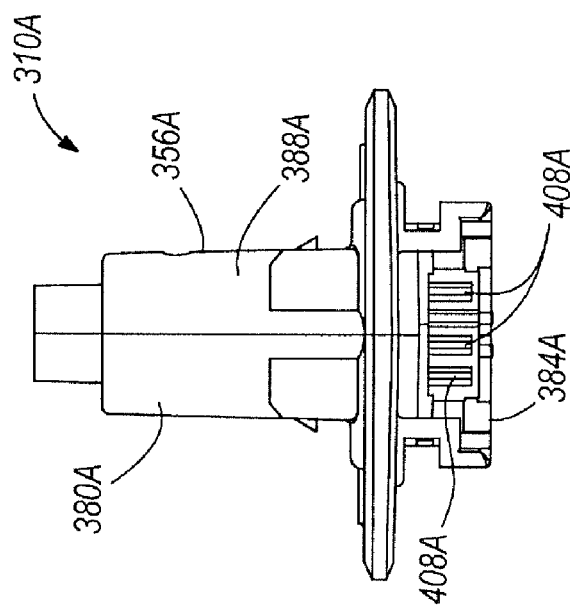
FIG. 34 is a front view of the adapter shown in FIG. 28.
Figure 36:
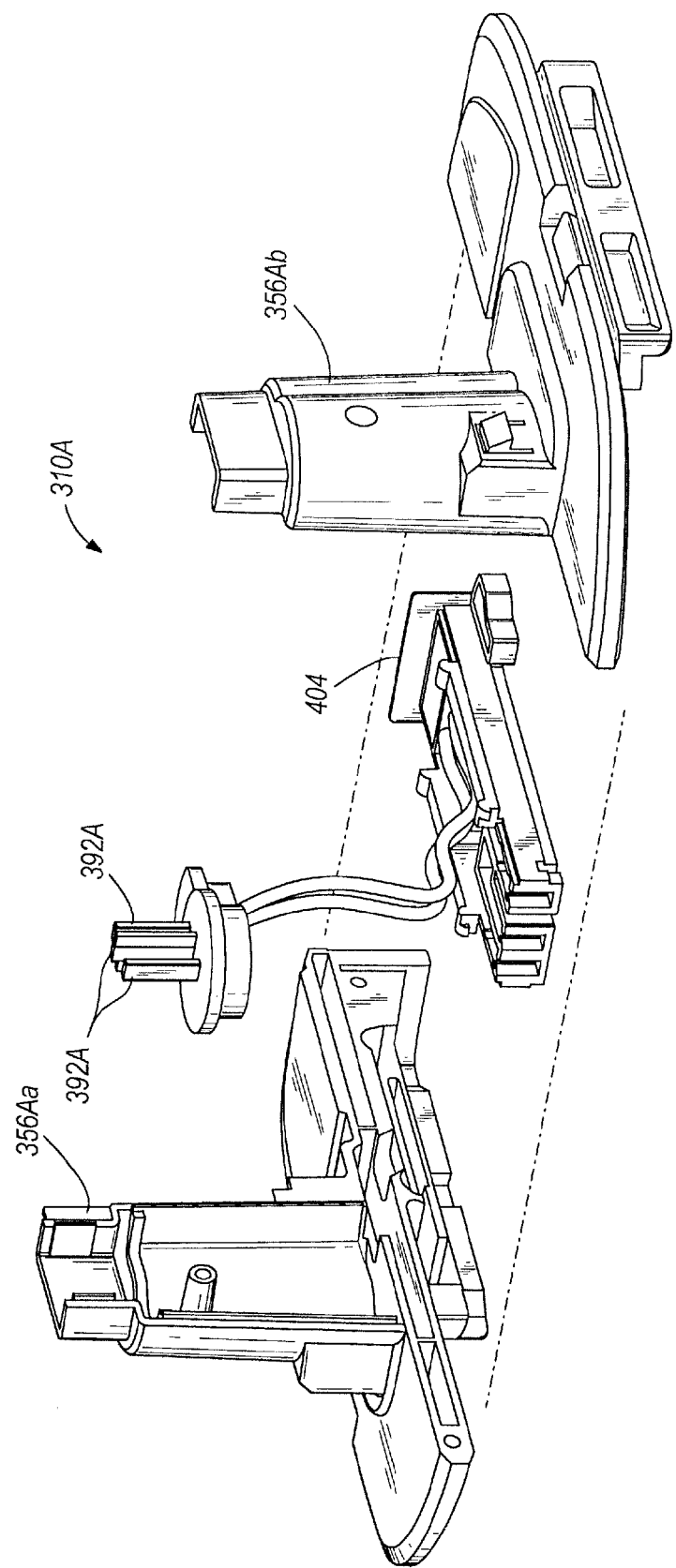
FIG. 36 is an exploded perspective view of the adapter shown in FIG. 28.
Figure 37:
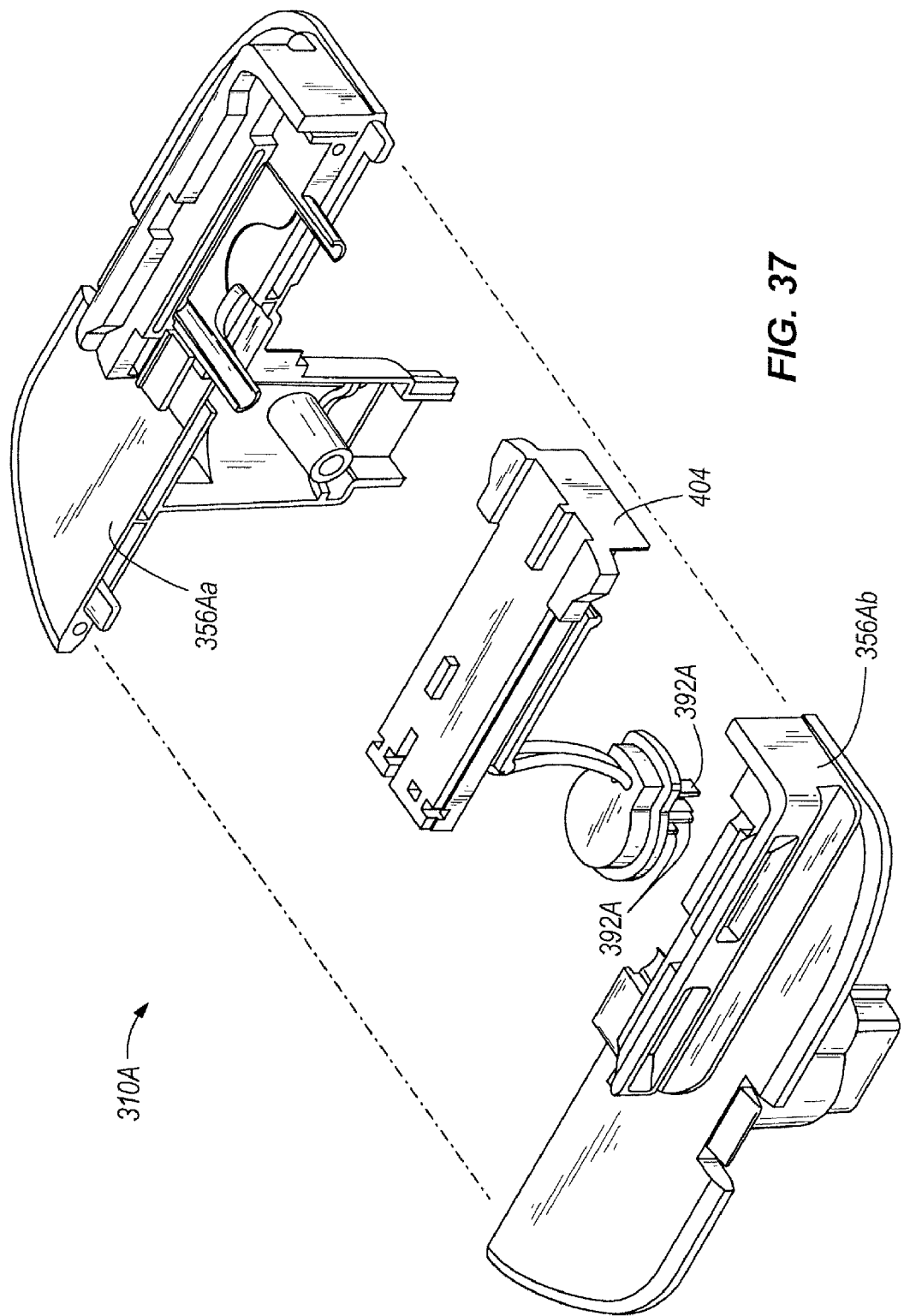
FIG. 37 is another exploded perspective view of the adapter shown in FIG. 28.
Figure 38:
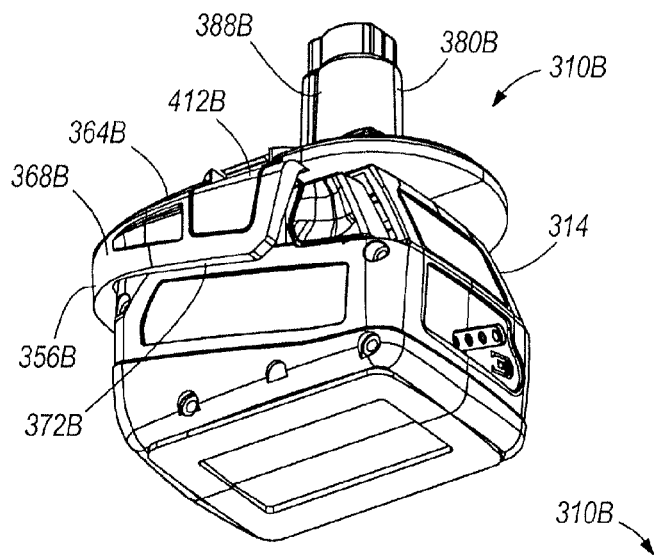
FIG. 38 is a bottom perspective view of another embodiment of the adapter and a battery pack.
Figure 39:
FIG. 39 is a top perspective view of the adapter and the battery shown in FIG. 38.
Figure 40:
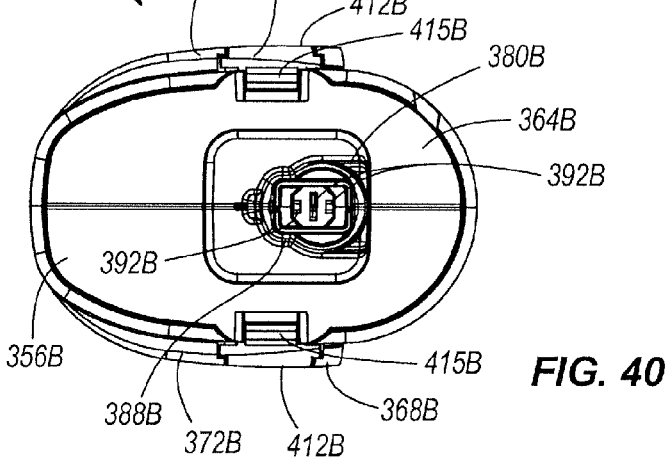
FIG. 40 is a top view of the adapter and the battery shown in FIG. 38.
Figure 41:
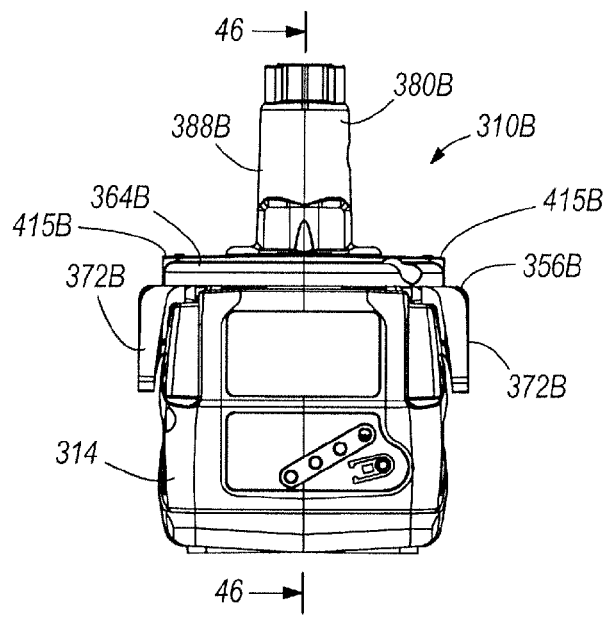
FIG. 41 is a front view of the adapter and the battery shown in FIG. 38.
Figure 42:
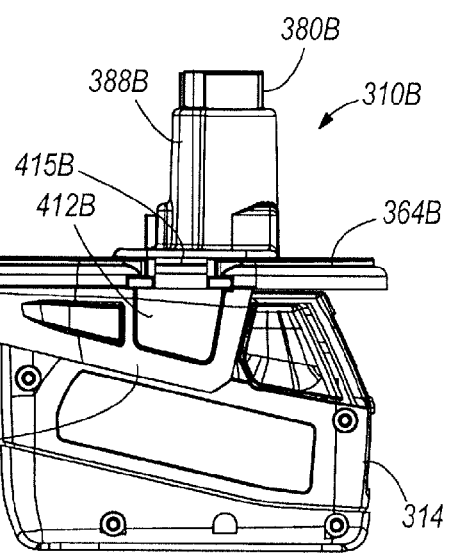
FIG. 42 is a side view of the adapter and the battery shown in FIG. 38.
Figure 43:
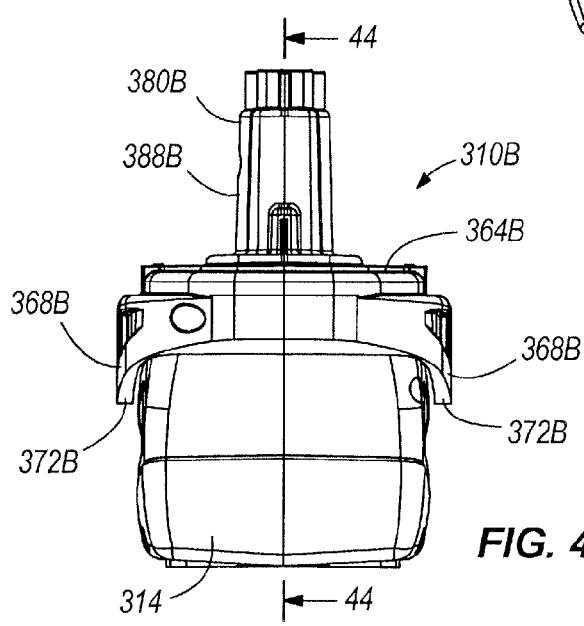
FIG. 43 is a rear view of the adapter and the battery shown in FIG. 38.
Figure 44:
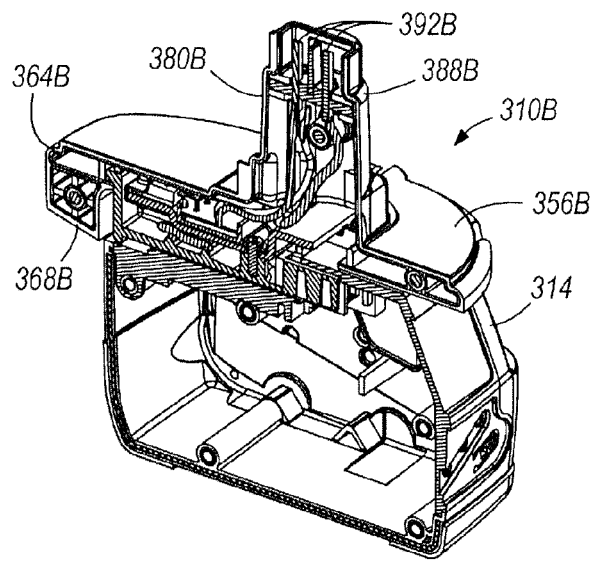
FIG. 44 is a sectional view taken along line 44-44.
Figure 45:
FIG. 45 is a bottom view of the adapter and the battery shown in FIG. 38.
Figure 46:
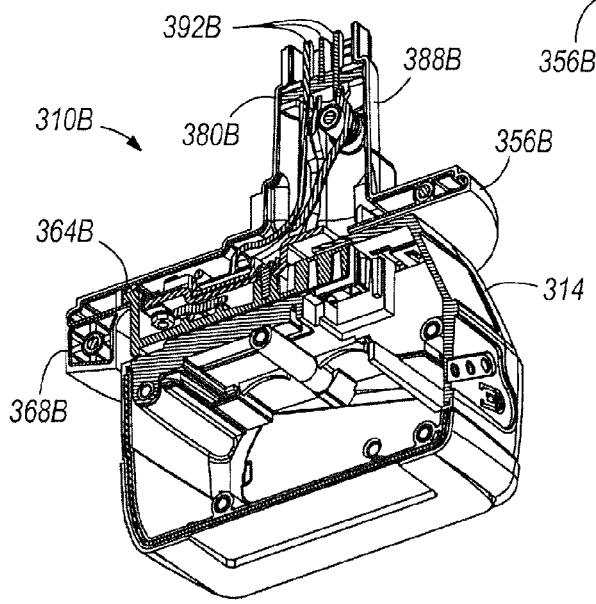
FIG. 46 is a sectional view taken along line 46-46.
Figure 47:
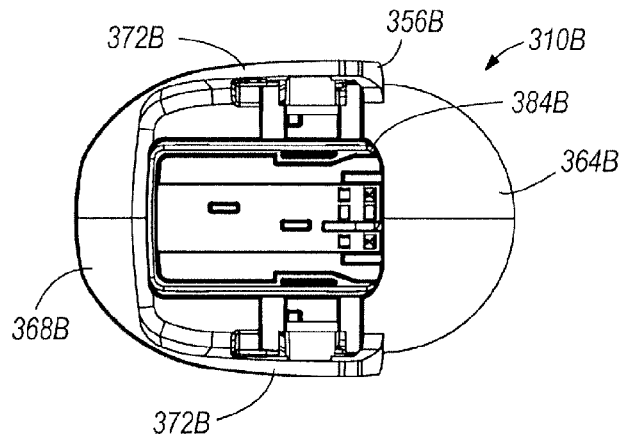
FIG. 47 is a bottom view of the adapter shown in FIG. 38.
Figure 48:
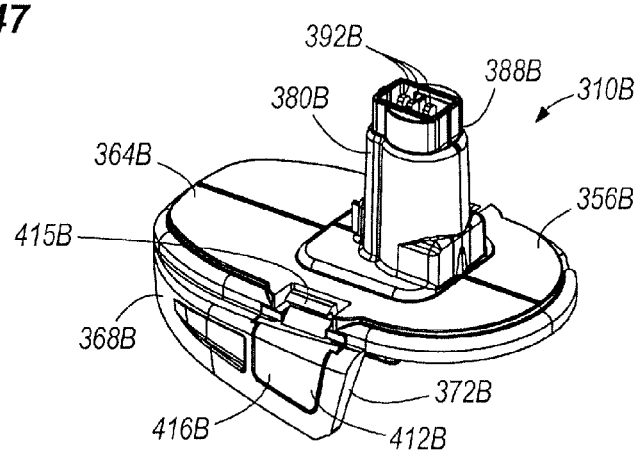
FIG. 48 is a front perspective view of the adapter shown in FIG. 38.
Figure 49:
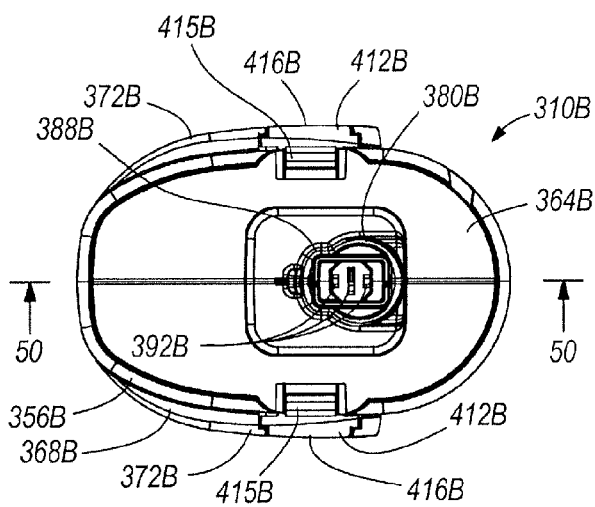
FIG. 49 is a top view of the adapter shown in FIG. 38.
Figure 50:
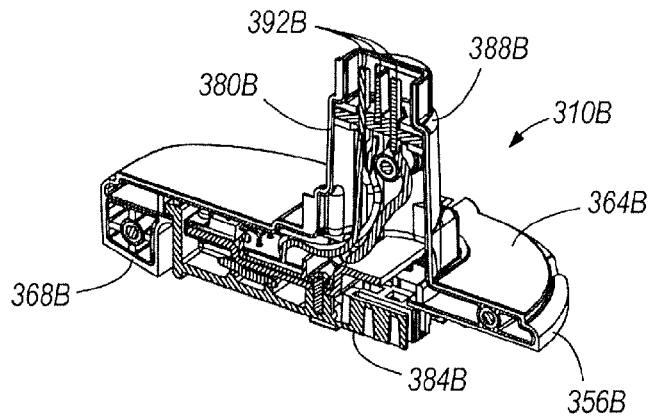
FIG. 50 is a sectional view taken along line 50-50.
Figure 51:
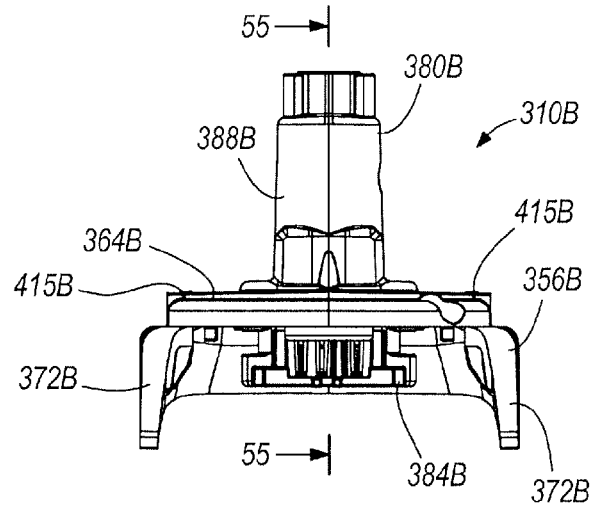
FIG. 51 is a front view of the adapter shown in FIG. 38.
Figure 52:
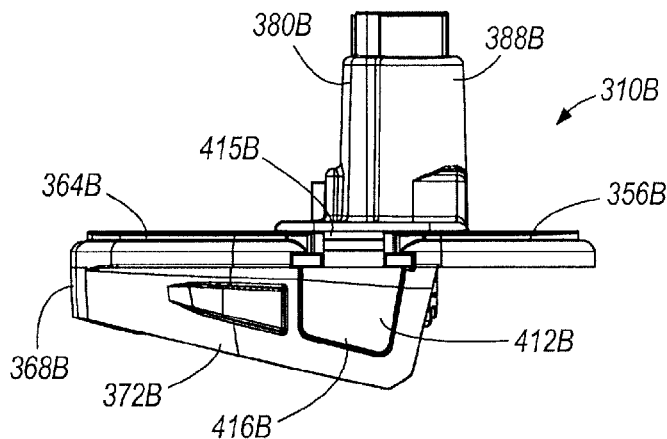
FIG. 52 is a side view of the adapter shown in FIG. 38.
Figure 53:
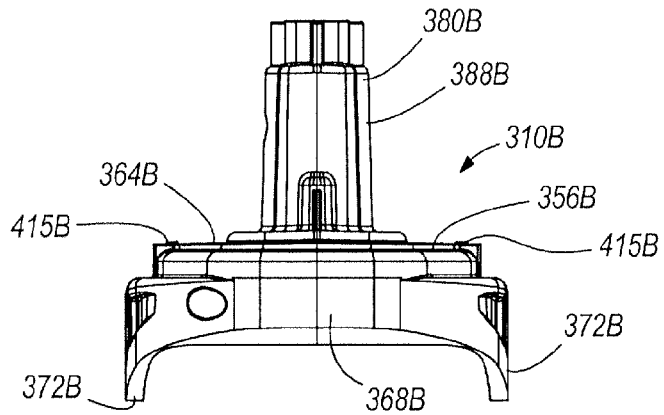
FIG. 53 is a rear view of the adapter shown in FIG. 38.
Figure 54:
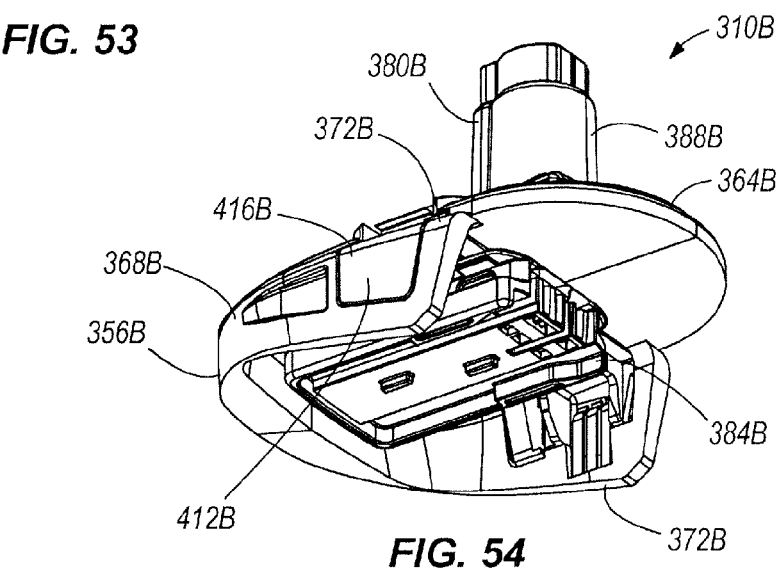
FIG. 54 is a bottom perspective view of the adapter shown in FIG. 38.
Figure 55:
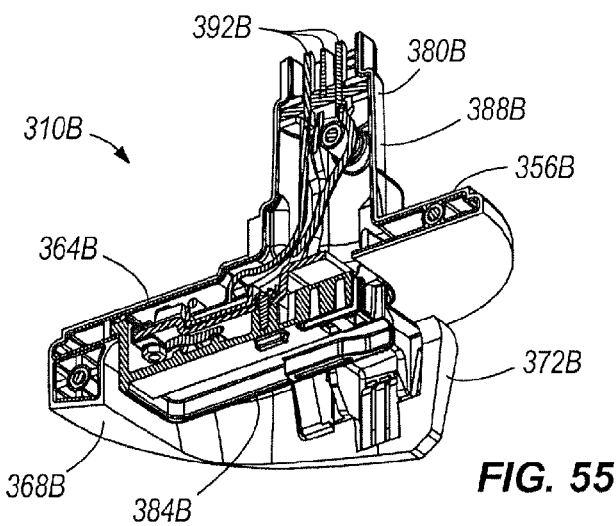
FIG. 55 is a sectional view taken along ling 55-55.
Figure 56:
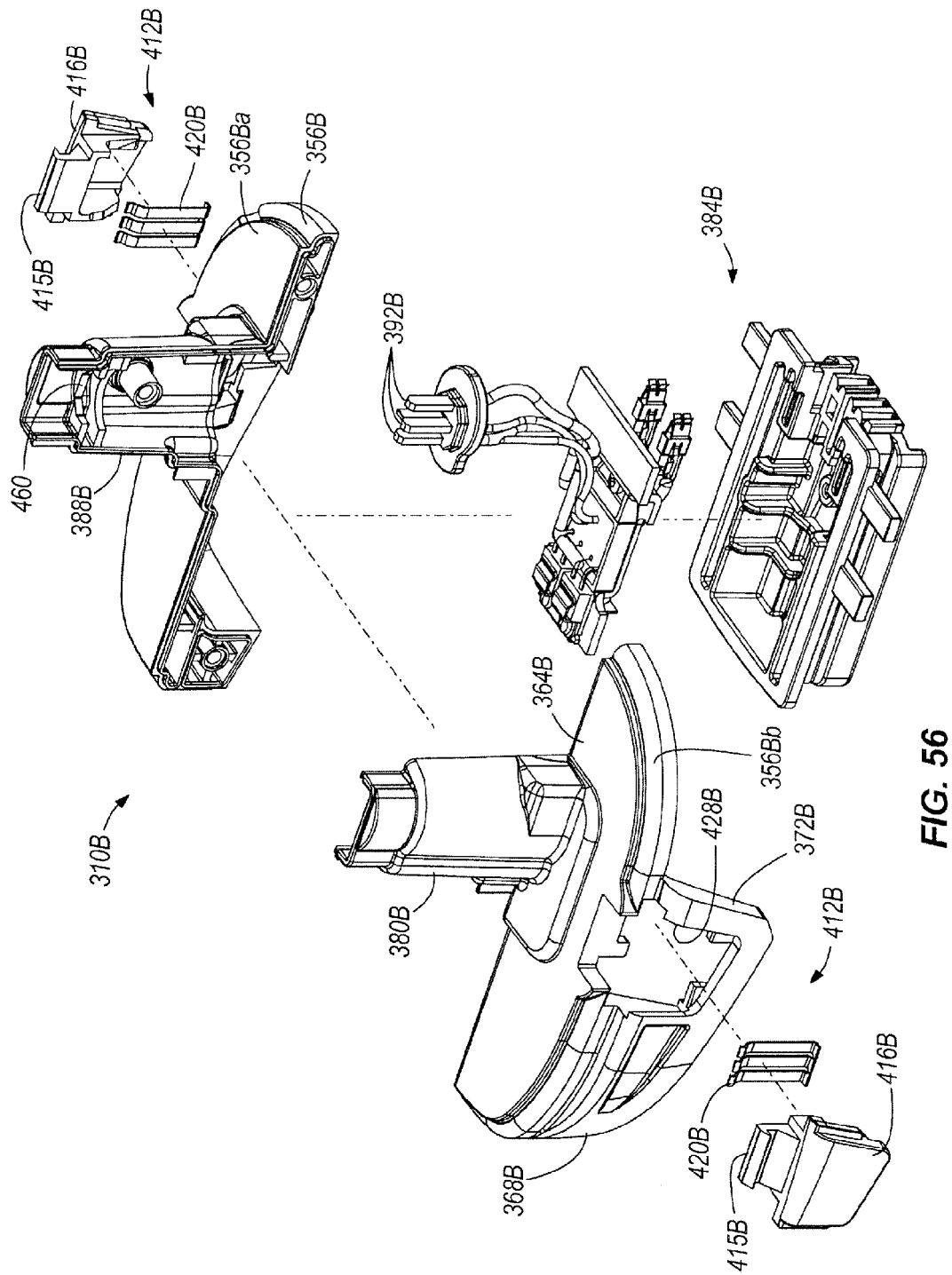
FIG. 56 is an exploded perspective view of the adapter shown in FIG. 38.
Figure 58:
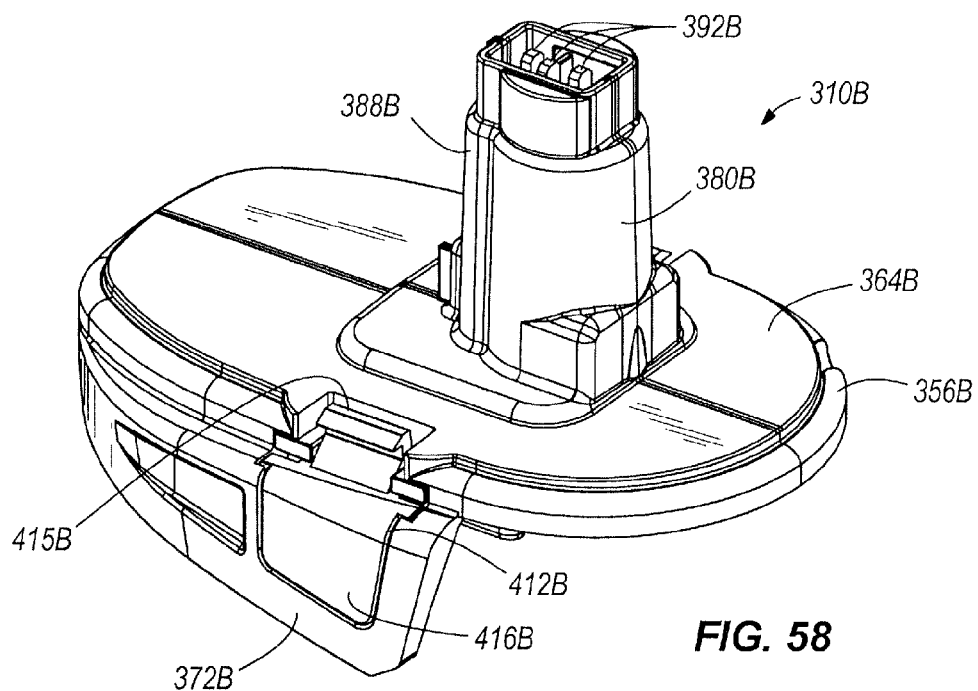
FIG. 58 is a top perspective view of the adapter shown in FIG. 38.
Figure 57:
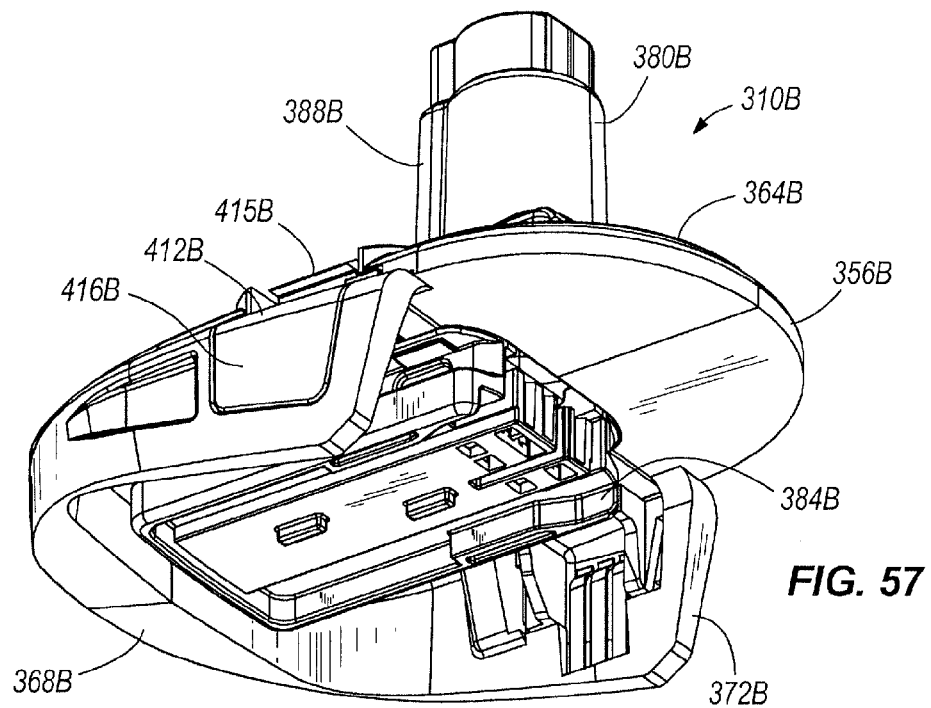
FIG. 57 is a bottom perspective view of the adapter shown in FIG. 38.

As shown in FIGS. 20, 21, and 23, the upper wall 364 of the adapter 310 can be configured to engage the handle portion 332 of the power tool 318. More particularly, in some embodiments, such as the illustrated embodiment of FIGS. 20-23, the upper wall 364 of the adapter 310 can be shaped to be received in an opening in the handle portion 332 of the power tool 318.

In the illustrated embodiment of FIGS. 20-23, the adapter 310 includes a first connecting structure 380 and a second connecting structure 384. As shown in FIGS. 20-23, the first connecting structure 380 can have a first configuration, such as, for example, a "tower" style configuration, and the second connecting structure 384 can have a second configuration, such as for example, a "slide-on" configuration. In this manner and as explained below, the adapter 310 is operable to electrically and mechanically connect an electrical component having a first connecting configuration 336 to a battery 314 having a second connecting configuration 352.

As shown in FIGS. 20-23, the first connecting configuration 380 includes a "tower" or upwardly-extending insertion portion 388. Electrical terminals are positioned on an upper end of the upwardly-extending insertion portion 388 for engagement with corresponding terminals located in the opening 340 to electrically connect the adapter 310 to the electrical circuit of the power tool 318. A guard 396 extends outwardly from the upper end of the upwardly-extending insertion portion 388 and surrounds the electrical terminals.

As partially shown in FIG. 23, the second connecting configuration 384 includes a pair of guide rails 400 and a terminal block 404 positioned between the guide rails 400. The guide rails 400 are configured to slidingly engage corresponding guide rails 354 on the battery 314 to connect the battery 314 to the adapter 310.

The terminal block 404 supports forwardly extending electrical terminals. More specifically, the terminal block 404 includes a positive electrical terminal and a negative electrical terminal for engagement with corresponding positive and negative battery terminals 353. In other embodiments, the terminal block 404 can include three or more electrical terminals, at least one of which can be a communication terminal for transmitting data from the battery 314 to the adapter 310, a controller supported in the adapter 310, the power tool 318, a controller supported in the power tool 318 or another electrical component. For example, in some such embodiments, the terminal block 404 can include an electrical terminal for conveying temperature data from a temperature sensor positioned in the battery 314 through a communication network supported in the adapter 310 to the power tool 318 or to a controller supported in the power tool 318.

The adapter 310 can also include latches 412 for selectively lockingly engaging the battery 314 and/or the power tool 318. In the illustrated embodiment of FIGS. 20-25, the adapter 310 includes two latches 412 positioned on the side walls 372 for selectively lockingly engaging the handle portion 332 of the power tool 318 to secure the adapter 310 to the power tool 318.

In some embodiments, such as the illustrated embodiment of FIGS. 20-25, when the battery 318 is secured to the adapter 310, the latches 412 of the adapter 310 are adjacent to latches of the battery 314. In some such embodiments, the latches of the battery 314 can include a locking member and an actuator operable to move the locking member into and out of locking engagement with a power tool, or alternatively, into and out of locking engagement with the adapter 310.

An alternate embodiment of an adapter 310A is illustrated in FIGS. 28-37. Common elements are identified by the same reference number and the letter "A".

As shown in FIGS. 28-37, the adapter 310A includes a housing 356A having first and second housing portions 356Aa, 356Ab connected together along a parting line. The adapter 310A also includes a first connecting structure 380A having an upwardly extending insertion portion 388A and a second connection portion 384A positioned below the upper wall 364A.

The first connecting structure 380A includes upwardly extending electrical terminals 392A and is electrically engageable with the electrical circuit of a power tool 318. The second connecting structure 384A includes a terminal block 404A supported between the first and second housing portions 356Aa, 356Ab and forwardly-extending electrical terminals 408A.

In the illustrated embodiment of FIGS. 28-37, the adapter 310A does not include any walls extending downwardly from the upper wall 364A. In this manner, when a battery 314 is supported on the adapter 310A, an operator can access substantially the entire battery 314, including the front of the battery 314, the rear of the battery 314 and the sides of the battery 314.

Another alternate embodiment of an adapter 310B is illustrated in FIGS. 38-58. Common elements are identified by the same reference number and the letter "B".

As shown in FIGS. 38-50, the adapter 310B includes a housing 356B having first and second housing portions 356Ba, 356Bb connected together along a parting line. The adapter 310B also includes a first connecting structure 380B having an upwardly extending insertion portion 388B and a second connection portion 384B positioned below the upper wall 364B.

The first connecting structure 380B includes upwardly extending electrical terminals 392B and is electrically engageable with the electrical circuit of a power tool 318. In some embodiments, such as the illustrated embodiment of FIGS. 38-58, the electrical terminals 392B can extend upwardly through openings 460 defined in the upwardly extending insertion portion 388B.

In the illustrated embodiment of FIGS. 38-58, the rear wall 368B and the side walls 372B extend a relatively short distance downwardly from the upper wall 364B of the adapter housing 356B to at least partially define a battery receiving cavity 360B. In this manner, when a battery 314 is supported on the adapter 310B, an operator can access a substantial portion of the battery 314, including the front of the battery 314, a portion of the rear of the battery 314 and portions of the sides of the battery 314. In addition, the housing 356B extends downwardly across rear and left and right sides of the battery 314.

The adapter 310B can also include latches 412B for selectively lockingly engaging the battery 314 and/or the power tool 318. In the illustrated embodiment of FIGS. 38-58, the adapter 310B includes two latches 412B positioned on the side walls 372B for selectively lockingly engaging the handle portion 332 of the power tool 318 to secure the adapter 310B to the power tool 318. Each of the latches 412B includes a locking member 415B and an actuator 416B supported in the adapter housing 356 for movement relative to the adapter housing 356 between a locked position, in which the actuator 416B moves the locking member 415B into locking engagement with the connecting configuration 336 of the power tool 318, and an unlocked position, in which the actuator 416B moves the locking member 415B away from the connecting configuration 336 of the power tool 318 so that the adapter 310 can be removed from the power tool 318.

Each of the latches 412B can include an elastic member 420B, which is supported in the adapter housing 356 adjacent to the actuator 416B and is operable to bias the actuator 416B toward the locked position. In the illustrated embodiment of FIGS. 38-58, actuators 416B extend outwardly through openings 428B in the side walls 364B of the adapter 310B for engagement by an operator's fingers.

In some embodiments, such as the illustrated embodiment of FIGS. 38-58, when a battery 314B is supported on the second connecting structure 384B of the adapter 310B, the battery 314B prevents the actuators 416B from moving the locking members 415B from the locked position toward the unlocked position. In some such embodiments, when the battery 314B is connected to the adapter 310B, the battery 314B or a portion of the battery 314B is positioned along a travel path of the actuator 416B and/or the locking member 415B to prevent the actuator 416B from moving the locking member 415B toward the unlocked position. In this manner, an operator is prevented from removing the adapter 310B and the battery 314B from the power tool 318 while the adapter 310 and the battery 314B are connected together. In these embodiments, the operator must first remove the battery 314B from the adapter 310B and then remove the adapter 310B from the power tool 318. In addition, in these embodiments, the operator is prevented from removing the adapter 310B and the battery 314B together and then placing the adapter 310B and the battery 314B on a battery charger configured for charging batteries having a configuration different than that of the battery 314B.

In some embodiments, the battery 314B can be manufactured by a first company and the power tool 318 can be manufactured by a second company. In other embodiments, the battery 314B and the power tool 318 can have different electronics. In these embodiments, it is particularly desirable to prevent operators from placing the adapter 310B and the battery 314B on a charger configured for charging a battery having a different configuration.

Although particular embodiments of the present invention have been shown and described, other alternative embodiments will be apparent to those skilled in the art and are within the intended scope of the present invention.

What is claimed is:

1. An electrical combination comprising:
a power tool having a housing supporting a motor, the motor being operable to drive a tool element;
a battery; and
an adapter supportable on the housing of the power tool and electrically connectable to the power tool and the battery such that the adapter transfers electrical power between the battery and the motor, the adapter having a locking arrangement engageable with the battery for preventing the adapter from being removed from the power tool housing while the battery is connected to the adapter.

2. The electrical combination of claim 1, wherein, when the battery is electrically connected to the adapter, the adapter at least partially encloses the battery.

3. The electrical combination of claim 1, wherein the locking arrangement includes a locking member and an actuator operable to move the locking member between a locked position and an unlocked position, and wherein, when the battery is electrically connected to the adapter, the battery prevents the locking member from being moved toward the unlocked position.

4. The electrical combination of claim 3, wherein the battery includes a latching arrangement including a locking member and an actuator operable to move the locking member between a locked position and an unlocked position, and wherein, when the battery is secured to the adapter, the actuator of the battery is adjacent to the actuator of the adapter.

5. The electrical combination of claim 1, wherein the locking arrangement includes a locking member engageable with the housing of the power tool and an actuator operable to move the locking member into engagement with the power tool, and wherein, when the battery is electrically connected to the adapter, the battery prevents the locking member from being moved out of engagement with the housing of the power tool.

6. The electrical combination of claim 1, wherein the adapter extends across a side surface of the battery.

7. The electrical combination of claim 1, wherein the power tool has a first connecting configuration and the battery has a second connecting configuration, the second connecting configuration being different than the first connecting configuration.

8. The electrical combination of claim 7, wherein the adapter has a first connecting configuration engageable with the first connecting configuration of the power tool and a second connecting configuration engageable with the second connecting configuration of the battery to connect the battery to the power tool.

9. The electrical combination of claim 8, wherein the locking arrangement secures the first connecting configuration of the adapter to the first connecting configuration of the power tool, and wherein the battery prevents the locking arrangement from being removed from the first connecting configuration of the power tool.

10. An electrical combination comprising:
an electrical component including a component housing, and an electrical circuit supported by the component housing;
a battery; and
an adapter having a locking arrangement and being electrically connectable to the power tool and the battery such that the adapter transfers electrical power between the battery and the electric circuit of the power tool, the locking mechanism being movable between a locked position, in which the locking mechanism secures the adapter to the power tool, and an unlocked position, in which the adapter is removable from the power tool, the locking mechanism being maintained in the locked position when the battery is connected to the adapter.

11. The electrical combination of claim 10, wherein, when the battery is electrically connected to the adapter, the adapter at least partially encloses a first side and a second side of the battery.

12. The electrical combination of claim 10, wherein the locking arrangement includes a locking member and an actuator operable to move the locking member between the locked position and the unlocked position, and wherein, when the battery is electrically connected to the adapter, the battery prevents the locking member from being moved between the unlocked position and the locked position.

13. The electrical combination of claim 12, wherein the battery includes a latching arrangement including a locking member and an actuator operable to move the locking member between a locked position and an unlocked position, and wherein, when the battery is secured to the adapter, the actuator of the battery is adjacent to the actuator of the adapter.

14. The electrical combination of claim 10, wherein the locking arrangement includes a locking member engageable with the housing of the power tool and an actuator operable to move the locking member into locking engagement with the power tool, and wherein, when the battery is electrically connected to the adapter, the battery prevents the locking member from being moved between the unlocked position and the locked position.

15. The electrical combination of claim 10, wherein the adapter extends around the battery.

16. The electrical combination of claim 10, wherein the power tool has a first connecting configuration and the battery has a second connecting configuration, the second connecting configuration being different than the first connecting configuration.

17. The electrical combination of claim 16, wherein the adapter has a first connecting configuration engageable with the first connecting configuration of the power tool and a second connecting configuration engageable with the second connecting configuration of the battery to connect the battery to the power tool.

18. The electrical combination of claim 17, wherein the locking arrangement secures the first connecting configuration of the adapter to the first connecting configuration of the power tool, and wherein the battery prevents the locking arrangement from being removed from the first connecting configuration of the power tool.

19. The electrical combination of claim 10, wherein the electrical component is a power tool, and wherein the electric circuit includes a motor supported in the housing, the motor being operable to drive a tool element.

20. A method of operating an electrical combination, the electrical combination including a power tool having a housing supporting a motor, a battery, and an adapter having a locking arrangement, the method comprising the acts of:
connecting the battery to the adapter and connecting the adapter to the power tool;
transferring electrical power from the battery to the electric circuit of the power tool;
operating the motor to drive a tool element; and
moving the locking arrangement relative to the adapter between a locked position, in which the locking arrangement secures the adapter to the housing of the power tool, and an locked position, in which the adapter is removable from the housing of the power tool, the battery preventing movement of the locking arrangement toward the unlocked position, when the battery is secured to the adapter.

21. The method of claim 20, further comprising removing the battery from the adapter and charging the battery in a battery charger.

22. The method of claim 20, further comprising removing the battery from the adapter before removing the adapter from the housing of the power tool.

* * * * *

UNITED STATES PATENT AND TRADEMARK OFFICE
CERTIFICATE OF CORRECTION

PATENT NO. : 7,443,137 B2  Page 1 of 1
APPLICATION NO. : 11/609675
DATED : October 28, 2008
INVENTOR(S) : John S. Scott et al.

It is certified that error appears in the above-identified patent and that said Letters Patent is hereby corrected as shown below:

On the title page: Related U.S. Application Data: should read

Item (63)  Continuation-in-part of application No. 11/252,272, filed on October 17, 2005, now Patent No. 7,339,350, which is a continuation of application No. 10/635,058, filed on August 6, 2003, now Patent No. 6,965,214, which is a continuation of application No. 10/299,200, filed on November 19, 2002, now Patent No. 6,621,246, which is a continuation of application No. 09/755,537, filed on January 5, 2001, now Patent No. 6,525,511, application No. 11/609,675, which is a continuation-in-part of application No. 11/095,780, filed on Mar. 31, 2005, now Pat. No. 7,183,745. This application 11/609,675 is also a continuation-in-part of application No. 11/095,780, filed on March 31, 2005, now Patent No. 7,183,745, which is a continuation of application No. 10/635,058, filed on August 6, 2003, now Patent No. 6,965,214, which is a continuation of application No. 10/299,200, filed on November 19, 2002, now Patent No. 6,621,246, which is a continuation of application No. 09/755,537, filed on January 5, 2001, now Patent No. 6,525,511.

Signed and Sealed this

Nineteenth Day of January, 2010

David J. Kappos
*Director of the United States Patent and Trademark Office*